United States Patent [19]

Brun et al.

[11] Patent Number: 4,558,023

[45] Date of Patent: Dec. 10, 1985

[54] PROCESS FOR THE PREPARATION OF AN ACTIVE SOLID HYDROCARBON WHICH CAN BE USED TO POLYMERIZE OLEFINES, AND A PROCESS FOR THE SYNTHESIS OF AN OLEFINIC POLYMER OR COPOLYMER USING THE SAID ACTIVE HYDROCARBON AS A CATALYTIC SYSTEM

[75] Inventors: Claude Brun, Idron Bizanos; Auguste Cheux, Arthez; Robert Pelletier, Billere, all of France

[73] Assignee: Atochem, Courbevoie, France

[21] Appl. No.: 583,102

[22] Filed: Feb. 23, 1984

[30] Foreign Application Priority Data

Feb. 28, 1983 [FR] France ................. 83 03229

[51] Int. Cl.[4] ................. C08F 4/62; C08F 4/64; C08F 4/68
[52] U.S. Cl. ................. 502/108; 502/109; 502/105; 526/90
[58] Field of Search ................. 502/108, 109, 105

[56] References Cited

U.S. PATENT DOCUMENTS

| | | | |
|---|---|---|---|
| 3,135,809 | 6/1964 | Bosmajian | 502/103 X |
| 4,123,386 | 10/1978 | Avaro et al. | 502/108 |
| 4,287,328 | 9/1981 | Kikuta et al. | 502/108 X |
| 4,304,891 | 12/1981 | Sato et al. | 502/109 X |
| 4,309,521 | 1/1982 | Sato et al. | 502/108 X |

FOREIGN PATENT DOCUMENTS 2066274A 7/1981 United Kingdom ............... 502/108

*Primary Examiner*—Patrick P. Garvin
*Attorney, Agent, or Firm*—Burgess, Ryan & Wayne

[57] ABSTRACT

Process for the preparation of an active solid hydrocarbon which can be used to polymerize olefines.

This process comprises forming a pulverulent composition by mixing a transition metal component, a porous organic or inorganic solid support and an organometallic compound of the organo-Al, organo-Mg or organo-Zn type, and polymerizing a controlled amount of one or more $C_2$ to $C_{12}$ olefines in the gas phase in contact with the pulverulent composition with a specific hourly conversion of the olefines to produce the active solid hydrocarbon.

The above active solid hydrocarbon can be used, by itself or together with an organometallic cocatalyst, as a catalytic system for polymerization of olefines, in particular in the gas phase.

29 Claims, No Drawings

PROCESS FOR THE PREPARATION OF AN ACTIVE SOLID HYDROCARBON WHICH CAN BE USED TO POLYMERIZE OLEFINES, AND A PROCESS FOR THE SYNTHESIS OF AN OLEFINIC POLYMER OR COPOLYMER USING THE SAID ACTIVE HYDROCARBON AS A CATALYTIC SYSTEM

The invention relates to a process for the preparation of an active solid hydrocarbon which is suitable for polymerising olefines. It also relates to a process for the synthesis of olefinic polymers or copolymers using the said active solid hydrocarbon as a catalytic system.

It is known that olefinic polymers or copolymers of high molecular weight and low ash content can be prepared by polymerising or copolymerising olefines such as ethylene and its higher homologues, in particular propene, but-1-ene, pent-1-ene, 4-methyl-pent-1-ene, hex-1-ene or oct-1-ene, by means of highly active supported catalysts of the Ziegler-Natta type, used by themselves or in the presence of a cocatalyst.

Such catalysts are usually obtained by combining a component comprising a transition metal compound, in particular a titanium compound such as TiCl$_4$, TiCl$_3$ or an alkyl titanate, with a magnesium compound, in particular MgCl$_2$, and, where relevant, an organic compound which donates electrons and/or a porous support of the metal oxide type. For the polymerisation of olefines, these catalysts are usually employed together with cocatalysts comprising compounds of the organo-aluminium or organomagnesium type.

The abovementioned catalysts, which are in the form of very fine powders characterised by a mean particle diameter of from a few microns to a few tens of microns, have a very high initial activity, which necessitates effective control of the exothermicity of the polymerisation at the start, if they are used directly for polymerisation of olefines.

For this reason, the above catalysts are primarily used in practice for polymerisation or copolymerisation of olefines in a liquid medium comprising an inert liquid, such as a saturated hydrocarbon, in particular hexane or heptane, or the olefine or olefines to be polymerised, these being kept in the liquid phase. In fact, in this case, where the polymerisation proceeds in a liquid medium, it is easy to control the exothermicity of the above polymerisation even at the start if the activity of the catalyst is very high.

In contrast, direct utilisation of the abovementioned catalysts in processes for the gas phase polymerisation of olefines runs into numerous difficulties. In fact, the considerable initial exothermicity of the polymerisation reaction, due to the high initial activity of the catalyst, is difficult to control under the conditions used for gas phase polymerisation, and the temperature of the polymer growing around the particles of the catalyst increases very rapidly to beyond the softening point of the polymer, with the result that, on the one hand, the polymer grains stick to the walls of the reactor and agglomerates are formed, which leads to blocking of the reactor, and, on the other hand, the catalyst loses its activity through encapsulation. Moreover, in the case of gas phase polymerisation in a fluidised bed, the fine grain size of the particles of the catalyst leads to considerable formation of fines which are entrained outside the fluidised bed with the gases and must be removed from the latter before recycling thereof.

It has already been proposed that, before the Ziegler-Natta catalysts are used for polymerisation of olefines in the gas phase, these catalysts should be modified by growing a polymeric shell around each of the catalyst particles so that an active solid hydrocarbon which can be used as a catalyst for the polymerisation of olefines in the gas phase is formed. To effect this, the catalyst, for example a titanium compound, together with an appropriate cocatalyst, in particular an alkyl-aluminium, is brought into contact with a controlled amount of one or more olefines, in particular ethylene, propene or but-1-ene, in an inert liquid, in particular a saturated hydrocarbon, such as n-heptane or hexane, and the polymeric product obtained, after having been separated off from the liquid medium by filtration or decantation, is subjected to extraction using an anhydrous solvent of the saturated hydrocarbon type, in order to increase the porosity of the active polymeric product.

It is possible to form, in this manner, a polymeric catalytic solid which has an initial activity lower than that of the initial Ziegler-Natta catalyst and is in the form of grains having a size less fine than that of the Ziegler-Natta catalyst, and as a result is more suitable for use in gas phase polymerisation than the Ziegler-Natta catalyst from which it originates. However, this mode of operation has disadvantages when a process for the gas phase polymerisation of olefines is used industrially, because the preparation of the active solid hydrocarbon in a liquid medium means that additional stages of extraction and drying of the said active solid hydrocarbon must be carried out and also that considerable volumes of liquid solvent and/or diluent must be handled and purified. Moreover, during the course of the polymerisation in a liquid medium, the non-crystalline fractions of the active solid hydrocarbon dissolve in the liquid medium and as a result it is impossible to obtain an active solid hydrocarbon of amorphous character, which could be of interest for producing copolymers having an amorphous or rubber-like character.

The invention proposes a process for the preparation, starting from a supported or unsupported catalyst of the Ziegler-Natta type, of an active solid hydrocarbon which can be used as a catalytic system, in particular for gas phase polymerisation of olefines, this process overcoming the disadvantages of the abovementioned previous process. In particular, in the process according to the invention, the active solid hydrocarbon is prepared in the gas phase, which eliminates the disadvantages associated with preparation in a liquid medium, and, in addition, measures are utilised which permit better control of the grain size and the bulk density of the active solid hydrocarbon and hence even of the polymer finally obtained when olefines are polymerised using the active solid hydrocarbon as a catalytic system.

The process, according to the invention, for the preparation of an active solid hydrocarbon which can be used to polymerise olefines is characterised in that it comprises forming a homogeneous pulverulent composition by combining (a) a compoent comprising a transition metal compound chosen from Ti, V, Zr and Cr, in the form of particles having an average diameter of between 0.1 and 500 microns, (b) a porous organic or inorganic solid support in the form of a powder and (c) a liquid phase containing at least one compound chosen from the organometallic compounds of the metals of groups I to III of the Periodic Table of the Elements, the amounts of the transition metal component and of the organometallic compound or compounds being such that the ratio of the number of atoms of the metal or metals of groups I to III of the Periodic Table to the number of atoms of transition metal is between 0.1 and 800, while the amount of support powder is adjusted so that the mixture produced remains in pulverulent form, and polymerising, in contact with the above pulverulent composition, one or more $C_2$ to $C_{12}$ olefines such that an active solid hydrocarbon containing an amount by weight of transition metal of between 10 and 50,000 ppm is produced, this polymerisation being carried out in the gas phase at a temperature below the melting point of the active solid hydrocarbon, whilst an hourly conversion of the $C_2$ to $C_{12}$ olefine or olefines of less than 500,000 g per gramme of transition metal is maintained.

In the present description and the associated claims, the term "mean diameter" applied to various particles designates the value of the diameter corresponding to the 50% value on the curve of the cumulative grain size distribution, by weight, of the particles in question.

Likewise the term "melting point" applied to the active solid hydrocarbon or to any other polymer designates the temperature beyond which the active solid hydrocarbon or any other polymer can no longer be considered a dry powder, whether due to melting of the crystalline phase, in the case of crystalline or semi-crystalline products, or due to softening of the amorphous phase, in the case of a polymer having an essentially amorphous character. Beyond this temperature, sticking and agglomerates are observed, which means that the powders cannot be considered to be formed from individualised grains.

The abovementioned pulverulent composition can be obtained by intimate mixing, under an inert atmosphere, of the transition metal component, the porous solid support and the liquid phase comprising the organometallic compound or compounds of metals of groups I to III of the Periodic Table of the Elements, in any device in which a homogeneous pulverulent mixture of the constituents can be obtained, and in particular in a stirred bed or fluidised bed reactor or a ribbon mixer. The pulverulent composition is preferably formed by first mixing the porous solid support powder with the liquid phase containing the organometallic compound or compounds, and then incorporating the transition metal component into the resulting mixture.

It is also possible to treat the transition metal component with an organometallic compound of metals of groups I to III of the Periodic Table of the Elements, and in particular with a portion of the organometallic compound used to obtain the pulverulent composition, before using the said transition metal component for the preparation of the said pulverulent composition.

The liquid phase containing the abovementioned organometallic compound or compounds can consist of a solution of the said organometallic compound or compounds in an inert solvent, in particular in an aliphatic hydrocarbon, such as n-hexane, n-heptane or isopentane. However, if the organometallic compound or compounds chosen is or are liquid, it is also possible, if desired, to use them in the absence of a solvent to form the said liquid phase.

The transition metal component can be formed from one or more compounds of the transition metals Ti, V, Zr and Cr. This transition metal component can also consist of a combination of one or more compounds of the said transition metals with a magnesium compound, in particular $MgCl_2$, MgO, $MgCO_3$, ClMgOH, magnesium phosphate RMgCl, $Mg(OR)_2$ or ClMgOR, where R designates a $C_1$ to $C_8$ alkyl radical and the said magnesium compound being combined, where relevant, with $AlCl_3$ or the product which results when $AlCl_3$ is brought into contact with an electron donor. The transition metal component, whichever of the above types it may be, can also include an adjuvant, such as a porous oxide compound chosen from $SiO_2$, $Al_2O_3$, $TiO_2$, $ZrO_2$, zeolites, mixed oxides containing $SiO_2$ and one or more metal oxides chosen from $ZrO_2$, $TiO_2$, MgO and $Al_2O_3$, or such as a polymeric or non-polymeric organic product, such as those containing silicon, of the siloxane type.

The transition metal compound, which is used, by itself or in combination with a magnesium compound, and, where relevant, an adjuvant of the porous oxide compound type or of the siloxane type, to form the transition metal component, is a Ti, V, Zr or Cr compound, preferably chosen from $TiCl_4$, $TiCl_3$, $VCl_4$, $VOCl_3$, $CrCl_3$, $CrO_3$, vanadium acetylacetonate, chromium acetylacetonate, $Ti(OR)_pCl_{(4-p)}$ and $Zr(OR)_pCl_{(4-p)}$, where R designates a $C_1$ to $C_8$ alkyl radical and p is an integer from 1 to 4.

The transition metal component preferably has a mean particle diameter of between 1 and 250 microns.

The porous inorganic or organic solid support in the form of a powder, which is used in the preparation of the pulverulent composition defined above, can advantageously be a polymer or an inorganic product, such as silica, talc or magnesia. In particular, the solid support in the form of a powder is an olefinic polymer and consists, especially, of an olefinic homopolymer or copolymer similar to or compatible with that which it is desired to produce by polymerisation of one or more olefines in the presence of the active solid hydrocarbon as a catalytic system. A particularly suitable porous solid support is a powder of a polyethylene, a polypropylene, a copolymer of ethylene with less than 20 mol % of one or more $C_3$ to $C_{12}$ alpha-olefines or, in particular, a copolymer of ethylene with less than 20 mol % of but-1-ene and/or hex-1-ene.

The porous solid support in the form of a powder advantageously has a mean particle diameter of from 1 to 5,000 microns, preferably from 20 to 3,000 microns.

As indicated above, the amount of powdered support in the ternary mixture constituting the pulverulent composition is adjusted so that the said mixture always remains in pulverulent form. This amount is advantageously 30 to 99.5%, preferably 50 to 99%, by weight, based on the mixture.

The organometallic compound or compounds of metals of groups I to III of the Periodic Table of the Elements which are present in the liquid phase used in the preparation of the pulverulent composition defined above are compounds in which the metal is bonded to at least one hydrocarbon radical by a carbon-metal bond. These compounds can advantageously be hydrocarbon-aluminium compounds chosen from isoprenyl-aluminium, the compounds called alumoxanes, which correspond to the general formula:

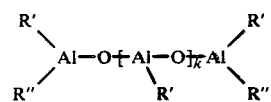

and the alkyl-aluminium compounds of the formula:

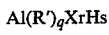

in which X represents Cl or a monovalent radical OR', R' designates a $C_1$ to $C_{16}$ alkyl radical, preferably a $C_1$ to $C_{12}$ alkyl radical, while q, r and s are numbers such that $1 \leq q \leq 3$, $0 \leq r \leq 2$ and $0 \leq s \leq 2$, where $q+r+s=3$, the radicals R'' each designate a radical R' or together form a bivalent radical —O—, and k is an integer having a value from 0 to 18. Particularly suitable compounds are those such as $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_2H_5)H_2$, and $Al(C_2H_5)_2(OC_2H_5)$, and especially the liquid compounds of the formulae $Al(C_6H_{13})_3$ and $Al(C_8H_{17})_3$.

The organometallic compound or compounds can also be chosen from the hydrocarbon-magnesium compounds and the hydrocarbon-zinc compounds, in particular from compounds of these types having the formula YMgR' or YZnR', in which Y represents Cl or and R' and R' designates a $C_1$ to $C_{16}$ alkyl radical, preferably a $C_1$ to $C_{12}$ alkyl radical, this compound being, in particular, in liquid form. Particular examples of such compounds are $Mg(C_2H_5)_2$, $Mg(i-C_4H_9)_2$, $ClMgC_2H_5$, $Mg(C_6H_{13})_2$, $Mg(C_8H_{17})_2$, $Zn(C_2H_5)_2$, $Zn(i-C_4H_9)_2$, $ClZnC_2H_5$ and $Zn(C_3H_7)_2$.

It is also possible to use, as the organometallic compounds, mixtures of one or more of the said hydrocarbon-magnesium compounds with one or more of the said hydrocarbon-zinc compounds and/or of the said hydrocarbon-aluminium compounds, in particular mixtures of an alkyl-aluminium compound and an alkyl-magnesium compound of the abovementioned formulae, and especially mixtures which are commercially available under the name MAGALA.

The ratio of the number of atoms of the metal or metals of groups I to III of the Periodic Table of the Elements to the number of transition metal atoms in the transition metal component in the pulverulent composition resulting from mixing the transition metal component, the porous solid support and the organometallic compound or compounds can vary between 0.1:1 and 800:1, as indicated above, and is preferably between 0.5:1 and 200:1.

The polymerisation of one or more $C_2$ to $C_{12}$ olefines in contact with the pulverulent composition, which leads to the active solid hydrocarbon, is carried out in a manner such that an active solid hydrocarbon is produced which contains an amount by weight of transition metal of between 10 and 50,000 ppm, this polymerisation being carried out in the gas phase at a temperature below the melting point of the active solid hydrocarbon to be prepared and with a specific hourly conversion of the said olefines.

This polymerisation can be carried out using a single $C_2$ to $C_{12}$ olefine, chosen, for example, from ethylene, propene, but-1-ene, hex-1-ene, 4-methyl-pent-1-ene and oct-1-ene, or a mixture of these olefines, in particular a mixture of ethylene and one or more $C_3$ to $C_{12}$ alpha-olefines, and especially a mixture of ethylene and one or more alpha-olefines such as propene, but-1-ene, 4-methylpent-1-ene or oct-1-ene, or a mixture of propene and one or more $C_4$ to $C_{12}$ alpha-olefines, and very particularly a mixture of ethylene and but-1-ene containing a molar proportion of but-1-ene of from 0.1 to 30%, or a mixture of ethylene, but-1-ene and hex-1-ene containing a total molar proportion of but-1-ene and hex-1-ene of from 0.1 to 30%, with a molar ratio of hex-1-ene:but-1-ene such that the hex-1-ene remains in the vapour state under the conditions of the gas phase polymerisation.

The said polymerisation is preferably carried out in a manner such that the active solid hydrocarbon produced contains an amount by weight of transition metal, originating from the transition metal component, of between 50 and 15,000 ppm.

For this polymerisation also, the hourly conversion of the $C_2$ to $C_{12}$ olefine or olefines is preferably kept between 10 and 100,000 g per gramme of transition metal originating from the transition metal component.

The abovementioned gas phase polymerisation is carried out in a known manner in any reactor in which a gas phase reaction can be carried out, in particular in a stirred bed reactor or a fluidised bed reactor, at a temperature below the melting point m.p. of the active solid hydrocarbon to be produced, the said temperature being, in particular, between $-20\,°C$ and $(m.p. -5)\,°C$, whilst maintaining the appropriate partial pressures in a manner such that the olefine or olefines present in the reactor is or are essentially in the vapour phase, that is to say any condensation of the said olefines does not modify the pulverulent appearance of the active solid hydrocarbon growing around the particles of the pulverulent composition which results from mixing the transition metal component with the porous solid support and the organometallic compound or compounds.

The gas phase polymerisation can be carried out in the presence of hydrogen in an amount of up to 80%, preferably between 1 and 70%, by volume, based on the total of the gas phase compounds present in the reactor. Amongst other things, as is well known in the art, the use of hydrogen means that the melt index of the active solid hydrocarbon produced can be adjusted.

Other compounds, in particular alkyl-zinc derivatives, such as zinc-diethyl or zinc-dipropyl, which act as chain transfer agents analogously to hydrogen, can also be used with or instead of hydrogen.

The polymerisation pressure, that is to say the total pressure of the gas phase contained in the reactor, can be controlled by addition of a gas which is inert with respect to the polymerisation reaction.

The conventional techniques of removal of the excess calories produced in the gas phase inside the reactor can be used to maintain the polymerisation temperature at the chosen value below the melting point of the active solid hydrocarbon being formed. In particular, internal cooling by injecting into the reactor a cold gas, a liquefied gas which vaporises in the reactor, using up the calories, or a gas in the supercritical state, which causes cooling by expansion in the reactor, can be applied. The excess calories can also be removed by external cooling using a reactor equipped with a double jacket in which a cooling liquid circulates. The hot reaction gases can advantageously be recycled via an external heat exchanger, where they are cooled before being returned to the reactor.

The $C_2$ to $C_{12}$ olefine or olefines which is or are polymerised in the gas phase in contact with the pulverulent composition defined above is or are injected into the polymerisation reactor under conditions such that, taking into account the other gas phase constituents, and especially the hydrogen and/or inert gas which may be added, the olefine or olefines in the gas phase inside the reactor is or are kept under the chosen conditions of temperature and pressure, to give, with an hourly conversion of the olefine or olefines of less than 500,000 g, preferably between 10 and 100,000 g, per gramme of transition metal originating from the transition metal component, a polymer, that is to say the active solid hydrocarbon, containing an amount by weight of transition metal, originating from the transition metal component, of between 10 and 50,000 ppm, preferably between 50 and 15,000 ppm.

The preparation of the pulverulent composition by mixing the transition metal component with the porous solid support and the organometallic compound or compounds defined above, and also the gas phase polymerisation of the $C_2$ to $C_{12}$ olefine or olefines in contact with the said pulverulent composition, can each be carried out discontinuously or continuously.

For discontinuous preparation of the pulverulent composition, the ingredients of which the composition consists are introduced into an appropriate mixing device and, after a sufficient homogenisation time, the mixture formed is collected. In a continuous operation, the ingredients of which the pulverulent composition consists are introduced continuously into a mixing device and the resulting mixture is removed continuously from the said mixer, the rates at which the ingredients are introduced and the mixture is removed being chosen so that the residence time of the ingredients in the mixture is sufficient to give a satisfactory homogeneity. In the discontinuous operation, as in the continuous operation, the porous solid support is preferably, as indicated above, mixed with the liquid phase containing the organometallic compound or compounds, and the transition metal component is then incorporated into the resulting mixture in order to give the pulverulent composition.

The discontinuous gas phase polymerisation of the $C_2$ to $C_{12}$ olefine or olefines in contact with the pulverulent composition can be carried out, for example, as follows. A controlled amount of the olefine or olefines to be polymerised in order to obtain an active solid hydrocarbon containing an amount by weight of transition metal, originating from the transition metal component, of between 10 and 50,000 ppm, preferably between 50 and 15,000 ppm, is introduced into the reactor, which is kept at the appropriate temperature and contains the said pulverulent composition and, where relevant, a gas phase consisting of a gas which is inert in respect of the polymerisation and/or hydrogen, this introduction being carried out in a manner such that the olefine or olefines is or are kept in the gas phase inside the reactor and the temperature is kept at the chosen value, and also such that the hourly conversion of the olefine or olefines is maintained within the limits defined above. In particular, the abovementioned controlled amount of the olefine or olefines can be introduced into the reactor by regulating the flow rate of the olefine or olefines into the reactor in a manner such that the three above conditions are fulfilled. Furthermore, if a mixture of at least two $C_2$ to $C_{12}$ monoolefines, in particular a mixture of ethylene and one or more $C_3$ to $C_{12}$ alphaolefines, such as, for example, a mixture of ethylene and but-1-ene or a mixture of ethylene, but-1-ene and hex-1-ene, is polymerised in the gas phase in contact with the pulverulent composition, the proportion of olefines injected into the reactor is controlled in a manner such that the composition of the gas phase reaction mixture in contact with the pulverulent composition is kept constant.

The gas phase polymerisation of the $C_2$ to $C_{12}$ olefine or olefines in contact with the pulverulent composition can be carried out continuously, for example as follows.

A charge of polymer powder is introduced into a stirred reactor and, after purification by flushing several times with nitrogen, a gas phase reaction mixture is established by adding the $C_2$ to $C_{12}$ olefine or olefines and, where relevant, hydrogen and/or an inert gas, until the desired value of the partial pressures of these is reached. A semi-continuous flow of the above pulverulent composition, advantageously through a lock flushed with nitrogen, and an hourly flow rate of the olefine or olefines proportional to the flow rate of the pulverulent composition are then introduced. The active solid hydrocarbon is extracted semi-continuously from the reactor, advantageously by means of a lock, in order to keep the total weight of solid inside the reactor constant. The temperature of the reactor is kept constant by using means of cooling the reactor, whilst the total pressure in the reactor is kept constant by addition of nitrogen or flushing with the gas of the atmosphere, depending on the case. The partial pressure of the hydrogen, measured by gas phase chromatography, is adjusted by changing the entry flow rate of the hydrogen.

An electron donor consisting of a Lewis base can be incorporated in the active solid hydrocarbon in an amount such that the ratio of the number of metal atoms of groups I to III of the Periodic Table which it contains to the number of molecules of electron donor is between 0.1:1 and 50:1, preferably between 1:1 and 20:1. The electron donor can be incorporated directly into the active solid hydrocarbon by mixing it with the latter. The electron donor can also be incorporated into the said active solid hydrocarbon at any point in the process for obtaining the latter, and in particular during the preparation of the pulverulent composition or at the time of the gas phase polymerisation of the $C_2$ to $C_{12}$ olefine or olefines in contact with the said pulverulent composition. The electron donor can be introduced in dilute or undiluted form in an inert liquid, in particular in a saturated hydrocarbon, by itself or in combination with the olefines and/or the organometallic compounds.

The electron donor can advantageously be chosen from alkyl esters of aliphatic or aromatic carboxylic acids, aliphatic or cyclic ethers, ketones, vinyl esters, acryl derivatives and, in particular, alkyl acrylates or methacrylates. Particularly suitable electron donors are compounds such as methyl formate, methyl paraloluate, ethyl benzoate, ethyl or butyl acetate, ethyl ether, tetrahydrofuran, dioxane, acetone, methyl isobutyl ketone, vinyl acetate and methyl methacrylate.

The active solid hydrqcarbcn obtained by the process just described can replace Ziegler-Natta catalyst systems formed starting from a transition metal component in combination with at least one organometallic compound of a metal of groups I to III of the Periodic Table of the Elements, and in particular a hydrocarbon-aluminium and/or hydrocarbon-magnesium compound, and, where relevant, an electron donor, for example of the type of those defined above, in order to catalyse the polymerisation of olefines to give olefinic polymers or copolymers.

In the context of the invention, the olefines which can be polymerised or copolymerised by means of the active solid hydrocarbon include not only the $C_2$ to $C_{18}$ hydrocarbons containing a single ethylenic unsaturation, in particular the monoolefines, such as ethylene, propene, but-1-ene, pent-1-ene, hex-1-ene, 4-methylpent-1-ene, oct-1-ene, dec-1-ene, dodec-1-ene, tridec- 1-ene, hexadec-1-ene and octadec-1-ene, but also conjugated or non-conjugated dienes, in particular butadiene, isoprene, hexa-1,4-diene, hexa-1,5-diene, vinylnorbornene and ethylidenenorbornene.

The active solid hydrocarbon according to the invention can be used, in particular, as a catalyst system for polymerisation of $C_2$ to $C_{12}$ monoolefines.

In particular, it is possible to polymerise a single $C_2$ to $C_{12}$ monoolefine, for example ethylene, propene or but-1-ene, in contact with the active solid hydrocarbon in order to produce the homopolymer corresponding to this monoolefine.

It is also possible to polymerise mixtures of at least two $C_2$ to $C_{12}$ olefines in contact with the said active solid hydrocarbon in order to produce copolymers of the said olefines. In particular, mixtures of ethylene and one or more $C_3$ to $C_{12}$ alpha-olefines can be polymerised, these mixtures, when they are in contact with the active solid hydrocarbon, containing a total molar proportion of $C_3$ to $C_{12}$ alpha-olefines of between 0.1 and 75%, preferably between 1 and 50%.

Mixtures of propene with ethylene and/or one or more $C_4$ to $C_{12}$ alpha-olefines can also be polymerised, the said mixtures, when they are in contact with the active solid hydrocarbon, containing a total molar proportion of ethylene and/or $C_4$ to $C_{12}$ alpha-olefines of between 0.1 and 75%, preferably between 1 and 50%.

Mixtures of ethylene and propene, with or without other alpha-olefines or diolefines, such that the molar ratio of ethylene:propene is between 0.02:1 and 50:1, preferably between 0.05:1 and 1:1, can furthermore be polymerised.

The polymerisation of the abovementioned olefines, and in particular of the $C_2$–$C_{12}$ monoolefines by themselves or in mixtures, by means of the active solid hydrocarbon, as indicated above, can be carried out in solution or suspension in an inert liquid medium, in particular in an aliphatic hydrocarbon, such as n-heptane, n-hexane or isobutane, or in at least one of the olefines to be polymerised, such as propene or but-1-ene, which is kept in the liquid state. The conditions under which these polymerisation reactions in a liquid medium are carried out are the conventional conditions proposed for similar cases using a conventional catalytic system of the supported or unsupported Ziegler-Natta type.

However, the active solid hydrocarbon according to the invention is of particular interest for gas phase polymerisation of the olefines or mixtures thereof just mentioned. In particular, a mixture of ethylene and one or more $C_3$ to $C_{12}$ alpha-olefines, such as propene, but-1-ene, 4-methyl-pent-1-ene, hex-1-ene or oct-1-ene, containing, when it is in contact with the active solid hydrocarbon, a molar proportion of the $C_3$ to $C_{12}$ alpha-olefines of between 0.1 and 50%, preferably between 1 and 40%, can be polymerised in the gas phase in contact with the said active solid hydrocarbon in order to produce an ethylene/alpha-olefine copolymer with a relatively low molar content of $C_3$ to $C_{12}$ alpha-olefine, known by the name of linear low-density polyethylene.

The gas phase polymerisation of the olefine or olefines in contact with the active solid hydrocarbon can be carried out in any reactor suitable for gas phase polymerisation, in particular in a stirred bed reactor or, preferably, in a fluidised bed reactor.

The conditions under which the gas phase polymerisation is carried out, in particular temperature, pressure, injection of the olefine or olefines into the stirred bed or fluidised bed reactor and control of the polymerisation temperature and pressure, are analogous to those proposed in the prior art for gas phase polymerisation of olefines.

The polymerisation is usually carried out at a temperature below the melting point m.p. of the polymer or copolymer to be synthesised, and especially between $-20°$ C. and (m.p. $-5$)°C., under a pressure such that the olefine or olefines and, where relevant, the other monomeric hydrocarbons present in the reactor are essentially in the vapour phase. The particular conditions of pressure and temperature to be chosen depend on the nature of the olefine or olefines to be polymerised.

The gas phase polymerisation can be carried out in the presence of a chain transfer agent, in particular hydrogen or an alkyl-zinc, such as zinc-diethyl, in a manner such that the melt index of the polymer or copolymer to be synthesised is controlled. The preferred chain transfer agent is hydrogen, which is used in an amount of up to 80%, preferably between 1 and 70%, of the volume of all the gaseous compounds present in the reactor.

The gas phase contained in the reactor can also comprise one or more gases which are inert in respect of the polymerisation reaction, in particular nitrogen, argon or saturated hydrocarbon gases, and this can enable the partial pressure inside the reactor to be controlled.

The polymerisation temperature can be controlled by internal cooling or by external cooling, as indicated for carrying out the gas phase polymerisation to produce the active solid hydrocarbon.

The methods of injection of the olefine or olefines to be polymerised into the reactor depend on the form in which these olefines are available under the conditions of storage pressure and temperature.

In a gas phase polymerisation carried out discontinuously, the olefine or olefines can be introduced into the reactor in a manner such that the pressure inside the reactor remains substantially constant and, in addition, in the case of copolymerisation, the ratio of the olefines injected into the reactor can be controlled.

In the case of gas phase polymerisation carried out continuously, the method of operation can be as follows.

An initial charge of the polymer is introduced into a stirred reactor, for example by fluidisation, and, after purification by flushing numerous times with nitrogen, a gas phase reaction mixture is established by introduction of the olefine or olefines and, usually, of the monomer or monomers to be polymerised, and, where relevant, hydrogen and/or an inert gas, in order to obtain the desired partial pressures. A given flow of active solid hydrocarbon is then introduced into the reactor, for example semi-continuously by means of a lock flushed with nitrogen. From the start of the injection of the active solid hydrocarbon into the reactor, a heating-up tendency is observed, which indicates the start of the polymerisation. The reactor is then kept at a constant temperature using cooling means, such as those proposed above. The pressure in the reactor can be regulated by changing the flow rate of the principal olefine injected into the reactor. The partial pressures, monitored, for example, by gas phase chromatography, are regulated by changing the flow rate of olefines, of hydrogen and of the inert gas. The total weight of powder in the reactor can be kept constant by changing the flow rate of powder leaving the reactor, for example by changing the opening frequency of a lock extraction system. In addition, since the activity of the active solid hydrocarbon may vary, the hourly production from the reactor can be adjusted by means of the entry flow rate of the said active solid hydrocarbon.

Whatever the method of polymerisation, an additional amount of one or more organometallic compounds of metals of groups I to III of the Periodic Table of the Elements, in particular of a hydrocarbon-aluminium and/or hydrocarbon-magnesium compound, which may or may not be similar to that used for the preparation of the active solid hydrocarbon, can be added, if necessary, to the polymerisation mixture of the olefine or olefines in the presence of the active solid hydrocarbon in order to adjust the concentration, in the reaction mixture, of metal atoms from groups I to III of the Periodic Table of the Elements, in particular aluminium and/or magnesium, and/or the ratio of the number of these atoms to the number of atoms of transition metal originating from the transition metal component, to the values chosen for the polymerisation.

If the active solid hydrocarbon does not contain an electron donor, the latter may be added to the polymerisation mixture of the olefine or olefines in the presence of the active solid hydrocarbon. In the case where an additional amount of one or more organometallic compounds is added to the polymerisation medium as indicated above, the electron donor can be added to the polymerisation medium as a mixture with the said additional amount of the organometallic compound or compounds.

It is also possible to add the said additional amount of the abovementioned organometallic compound or compounds and/or the electron donor to the active solid hydrocarbon after preparation of the latter but before this is used in the polymerisation of the olefine or olefines. In the case of gas phase polymerisation, this latter procedure is particularly advantageous. In fact, there is only a single catalytic component to be injected into the reactor, which facilitates control of the reaction and simplifies the means of introduction. Furthermore, the said procedure avoids the problems of agglomeration which may result from injection of liquid compounds into a reaction of the gas/solid type. In addition, the organometallic compound thus added to the active solid hydrocarbon usually has no pyrophoric character at all.

The invention is illustrated by the non-limitative examples given below.

EXAMPLE 1 a—Preparation of the Active Solid Hydrocarbon 186 g of a porous solid support consisting of a low density polyethylene powder with a grain size of between 100 and 160 microns and a mean particle diameter equal to 135 microns, and 12.26 g of pure tri-n-hexyl-aluminium in the form of a liquid, were introduced into a dried 1 liter flask, which was kept under a nitrogen atmosphere and the components were homogenized under a nitrogen atmosphere.

12.19 g of a component containing $TiCl_4$ resulting from the grinding together of $TiCl_4$ with $MgCl_2$ and the product of the reaction between $AlCl_3$, anisole and ethyl benzoate, prepared as disclosed in Example 1 of French patent publication No. 2,481,705, application No. 81 08840 page 19, the said component containing, by weight, 1.8% of titanium and 14% of magnesium and being in the form of particles having a mean diameter of 70 microns and a specific surface area of about 0.6 $m^2/g$, were then added to the product obtained, still under a nitrogen atmosphere.

The resulting mixture was then homogenized under nitrogen to give a pulverulent composition in which the ratio of the number of atoms of aluminium originating from the tri-n-hexyl-aluminium to the number of atoms of titanium was equal to 9.70:1.

The pulverulent composition obtained was introduced into a reactor equipped with a stirrer revolving at a speed of 400 revolutions/minute, this reactor being kept under nitrogen and heated at 70° C.

Nitrogen and hydrogen were then injected into the reactor until the partial pressures obtained were equal to 4.5 bar for nitrogen and 0.5 bar for hydrogen. A mixture of ethylene and but-1-ene in a molar ratio of but-1-ene: ethylene equal to 0.0466:1 was then passed into the said reactor in the course of 30 minutes, the flow rate being such that the flow rate of ethylene represented 100 liters/hour, and the same mixture was then passed in with a flow rate of ethylene equal to 200 liters/hour for 3.5 hours.

After a polymerisation time of 1.5 hours, 30 ml of pure tri-n-hexyl-aluminium were then introduced into the reactor at a rate of 0.5 ml/minute, with the aid of a metering pump.

After a reaction time of 4 hours, 1,257 g of an active solid hydrocarbon were obtained, under an inert atmosphere, in the form of a powder, which was stored in a glove box under an inert nitrogen atmosphere.

This polymeric active solid hydrocarbon had the following characteristics:

| | |
|---|---|
| Content of Ti | 174 ppm, by weight |
| Content of Al | 1,766 ppm, by weight |
| Density | 0.926 |
| Mean particle diameter | 280 microns |
| Bulk density (heaped product) | 0.451 g/cm$^3$ |
| Melt index ($MI^{2.16}_{190° C.}$) | 8.8 | b—Gas Phase Polymerisation of Ethylene in Contact with the Active Solid Hydrocarbon to give High Density Polyethylene The polymerisation was carried out in a reactor equipped with a stirrer revolving at a speed of rotation of 400 revolutions/minute, the said reactor being heated at a temperature of 85° C.

Hydrogen and ethylene were injected into the stirred reactor until hydrogen and ethylene pressures equal to, respectively, 4 bar and 13 bar were obtained. 20 g of the active solid hydrocarbon prepared as described in the first section of this example were then introduced into the said reactor, 2.5 ml of a 6.4 g/liter solution of vinyl acetate in heptane having been deposited on the hydrocarbon prior to its introduction into the reactor. The active solid hydrocarbon was introduced into the reactor by forcing in with nitrogen, the injection of nitrogen being continued until the pressure inside the reactor had reached a value equal to 21 bar. 5 ml of a 400 g/liter solution of tri-n-hexyl-aluminium in heptane were then added via a metering pump, and the pressure in the reactor was kept at the value of 21 bar by injection of ethylene.

After a reaction time of 4 hours, 800 g of high density pulverulent polyethylene were obtained with the following characteristics:

| | |
|---|---|
| Content of Ti | 4.35 ppm, by weight |
| Content of Al | 306 ppm, by weight |
| Density | 0.952 |
| Mean particle diameter | 1,200 microns |
| Bulk density (heaped product) | 0.410 g/cm$^3$ |
| Melt index (MI$^{2.16}_{190°C.}$) | 0.5 | c—Gas Phase Polymerisation of Propene in Contact with the Active Solid Hydrocarbon The polymerisation was carried out in a reactor equipped with a stirrer revolving at a speed of rotation equal to 460 revolutions/minute, the said reactor being kept at a temperature of 83° C. throughout the duration of the polymerisation.

6.7 ml of a 375 g/liter solution of triisobutyl-aluminium in heptane, 5 ml of a 115 g/liter solution of methylparatoluate in heptane and 24 g of the active solid hydrocarbon obtained in the first section of Example 1 were introduced into the said stirred reactor, while the reactor was flushed with propene, and injection of the propene was continued until a pressure of 9 bar was obtained in the reactor. The theoretical molar ratios of Al:Ti and Al: methylparatoluate in the reaction mixture thus formed in the reactor were, respectively, equal to 174:1 and 3.96:1. The pressure in the reactor was subsequently kept at the value of 9 bar by controlled injection of propene over a period of 3 hours.

At the end of this period, the injection of propene was stopped and the gas phase was removed, with cooling, the polymerisation thus being stopped.

320 g of polypropylene powder with the following characteristics were obtained:

| | |
|---|---|
| Content of Ti | 13 ppm, by weight |
| Content of Al | 1,280 ppm, by weight |
| Bulk density (heaped product) | 0.461 g/cm$^3$ |
| Melt index (MI$^{2.16}_{230°C.}$) | 12 |
| Productivity (g per g of the component containing TiCl$_4$ | 1,384 |

EXAMPLE 2 a—Preparation of the Active Solid Hydrocarbon 160 g of a support consisting of a low density polyethylene powder with a grain size of between 100 and 160 microns and a mean particle diameter equal to 135 microns, and 11.6 g of pure tri-n-octyl-aluminium in the form of a Liquid, were introduced into a dry 1 Liter flask, which was kept under a nitrogen atmosphere, and the components were homogenised under a nitrogen atmosphere.

8.65 g of a component containing TiCl$_4$ resulting from the grinding together of TiCl$_4$ with MgCl$_2$ and the product of the reaction between AlCl$_3$, anisole and ethyl benzoate, the said component containing, by weight, 1.8% of titanium and 14% of magnesium and being in the form of particles having a mean diameter of 70 microns and a specific surface area of about 0.6 m$^2$/g, were then added to the product obtained, still under a nitrogen atmosphere.

The resulting mixture was then homogenised under nitrogen to give a pulverulent composition in which the ratio of the number of atoms of aluminium originating from the tri-n-octyl-aluminium to the number of atoms of titanium was equal to 9.90:1.

The pulverulent composition obtained was introduced into a reactor equipped with a stirrer revolving at a speed of 400 revolutions/minute, this reactor being kept under nitrogen and heated at 70° C.

Nitrogen and hydrogen were then injected into the reactor until the partial pressures obtained were equal to 5 bar for nitrogen and 0.5 bar for hydrogen. A mixture of ethylene and but-1-ene in a molar ratio of but-1-ene: ethylene equal to 0.0466:1 was then passed into the said reactor in the course of 30 minutes, the flow rate being such that the flow rate of ethylene represented 100 liters/hour, and the same mixture was then passed in with a flow rate of ethylene equal to 200 liters/hour for 3.5 hours.

After a polymerisation time of 2.5 hours, 44 g of pure tri-n-octyl-aluminium were then introduced into the reactor with the aid of a metering pump, this addition being carried out in the course of 1 hour.

After a reaction time of 4 hours, 1,210 g of an active solid hydrocarbon were obtained, under an inert atmosphere, in the form of a powder, which was stored in a glove box.

This active solid hydrocarbon had the following characteristics:

| | |
|---|---|
| Content of Ti | 128 ppm, by weight |
| Content of Al | 3,446 ppm, by weight |
| Density | 0.9245 |
| Mean particle diameter | 390 microns |
| Bulk density (heaped product) | 0.400 g/cm$^3$ |
| Melt index (MI$^{2.16}_{190°C.}$) | 4.35 | b—Gas Phase Polymerisation of a Mixture of Ethylene and Propene in Contact with the Active Solid Hydrocarbon to give a Random Amorphous Copolymer The polymerisation was carried out in a reactor equipped with a stirrer revolving at a speed of rotation of 360 revolutions/minute, the said reactor being heated at a temperature of 75° C.

21 g of the active solid hydrocarbon prepared as indicated at the start of Example 2 were introduced into the said reactor, which had first been dried and was kept flushed with nitrogen (partial pressure of nitrogen equal to 1 bar). Ethylene and propene were then injected into the reactor at flow rates equal to 100 liters/-hour for ethylene and 125 g/hour for propene.

After a reaction time of 3 hours, the total pressure inside the reactor was equal to 11 bar.

The reactor was then cooled and emptied, and 580 g of a random ethylene/propene copolymer of amorphous character were subsequently obtained. This copolymer contained 65% by weight of ethylene and was in the form of a powder having a mean particle diameter of about 1,000 microns.

The copolymer powder contained no agglomerates and the inside of the reactor was perfectly clean.

EXAMPLE 3 a—Regulation of the Size of the Particles of the Active Solid Hydrocarbon

Three experiments were carried out, namely 3.a.1, 3.a.2 and 3.a.3, in which an active solid hydrocarbon was prepared according to the procedure for the preparation of the active solid hydrocarbon described in section a of Example 1, but using different amounts of the component containing TiCl$_4$ and of tri-n-hexyl-aluminium (abbreviated to THA) to form the pulverulent composition and varying the nature, amount and grain size of the porous solid support, as indicated below, and adding no THA to the reaction mixture during the polymerisation, the other operating conditions being identical to those given in Example 1.

SPECIFIC CONDITIONS OF THE EXPERIMENTS

| Experiment 3.a.1: | |
|---|---|
| Component containing TiCl$_4$ | 9.4 g |
| Pure THA | 8 g |
| Porous solid support of a linear low density polyethylene having a grain size of less than 500 microns and a mean particle diameter equal to 300 microns. | 100 g |
| Molar ratio Al:Ti | 7.98:1 |

| Experiment 3.a.2: | |
|---|---|
| Component containing TiCl$_4$ | 12.4 g |
| Pure THA | 15 g |
| Molar ratio Al:Ti | 11.32:1 |
| Porous solid support of a low density polyethylene obtained by a high pressure process and having a grain size of less than 250 microns and a mean particle diameter equal to 140 microns. | 100 g |

| Experiment 3.a.3: | |
|---|---|
| Component containing TiCl$_4$ | 9.2 g |
| Pure THA | 10.8 g |
| Molar ratio Al:Ti | 10.99:1 |
| Porous solid support of a low density polyethylene obtained by a high pressure process and having a grain size of less than 100 microns and a mean particle diameter equal to 70 microns. | 86 g |

The active solid hydrocarbons obtained in the various experiments had the following characteristics:

| No. of the Experiment | 3.a.1 | 3.a.2 | 3.a.3 |
|---|---|---|---|
| Weight of active solid hydrocarbon (g) | 1,100 | 1,100 | 975 |
| Content of Ti (ppm, by weight) | 153 | 203 | 170 |
| Content of Al (ppm, by weight) | 690 | 1,295 | 1,052 |
| Density | 0.9215 | 0.9218 | 0.9215 |
| Mean particle diameter (microns) | 600 | 330 | 260 |
| Bulk density of the heaped product (g/cm$^3$) | 0.346 | 0.410 | 0.383 |
| Melt index (MI$^{2.16}_{190°\,C.}$) | 0.09 | 1.2 | 4.52 |

From these results, it appeared that the choice of grain size, and in particular of the mean particle diameter, of the porous solid support used to form the pulverulent composition starting from which the active solid hydrocarbon is produced permits regulation of the particle size, and in particular of the mean particle diameter, of the said active solid hydrocarbon, this size increasing with the size, and in particular with the mean diameter, of the particles of the said support, the other conditions being otherwise substantially equal.

b—Gas Phase Polymerisation of a Mixture of Ethylene and but-1-ene in Contact with Active Solid Hydrocarbons to give Ethylene/but-1-ene Copolymers or Low Density Linear Polyethylenes Three experiments were carried out, namely 3.b.1, 3.b.2 and 3.b.3, in which gas phase polymerisation of a mixture of ethylene and but-1-ene was effected using the active solid hydrocarbons obtained as described in section a of this example as catalytic systems.

The experiments were carried out in a reactor equipped with a stirrer revolving at a speed of rotation of 400 revolutions/minute, the said reactor being kept at a temperature of 85° C.

But-1-ene was injected into the dried reactor, which was kept under vacuum, until a pressure of but-1-ene equal to 1 bar was obtained. THA was then introduced into the reactor in an amount which varied according to the experiments, and which corresponded to 4.70 ml of a 300 g/liter solution of THA in heptane in Experiment 3.b.1, to 1.85 ml of pure THA in Experiment 3.b.2 and to 4.5 ml of pure THA in Experiment 3.b.3. But-1-ene, of pure THA in Experiment 3.b.2 and to 4.5 ml of pure THA in Experiment 3.b.3. But-1-ene, hydrogen and ethylene were then injected successively into the reactor until partial pressures of but-1-ene, hydrogen and ethylene equal to, respectively, 2 bar, 1.5 bar and 13.5 bar were obtained. A certain amount of the active solid hydrocarbon prepared in section a of this example was then introduced into the said reactor. The active solid hydrocarbon was introduced into the reactor by forcing in with nitrogen, and injection of nitrogen was continued until the total pressure inside the reactor had reached a value equal to 21 bar. The pressure in the reactor was then kept at this value by injection of a mixture of ethylene and but-1-ene in a molar ratio of but-1-ene:ethylene equal to 0.0466.

After a reaction time of 4 hours, the polymerisation was stopped by decompression of the reactor, the said reactor was flushed with nitrogen and cooled and the ethylene/but-1-ene copolymer formed was collected, the said copolymer being designated in the art as linear low density polyethylene (abbreviated to LLDPE).

The specific operating conditions for each experiment and the results obtained are given below.

| Experiment No. | 3.b.1 | 3.b.2 | 3.b.3 |
|---|---|---|---|
| Active solid hydrocarbon | | | |
| origin | 3.a.1 | 3.a.2 | 3.a.3 |
| amount (g) | 13 | 17 | 17.7 |
| mean particle diameter (microns) | 600 | 330 | 260 |
| Weight of LLDPE obtained (g) | 1,100 | 1,840 | 1,300 |
| Characteristics of the LLDPE | | | |
| Content of Ti (ppm, by weight) | 1.80 | 1.87 | 2.31 |
| Content of Al (ppm, by weight) | 130 | 41 | 277 |
| Density | 0.9225 | 0.9235 | 0.9220 |
| Mean particle diameter (microns) | 1,600 | 1,250 | 1,100 |

-continued

| Experiment No. | 3.b.1 | 3.b.2 | 3.b.3 |
|---|---|---|---|
| Bulk density of the heaped product (g/cm$^3$) | 0.346 | 0.410 | 0.340 |
| Melt index (MI$^{2.16}_{190°\ C.}$) | 0.63 | 0.86 | 0.58 |

All conditions otherwise being substantially equal, the mean particle diameter of the copolymer (LLDPE) obtained increases with the mean particle diameter of the active solid hydrocarbon used as the catalytic system, this latter mean diameter also increasing with the mean particle diameter of the porous solid support used in the preparation of the active solid hydrocarbon. The mean particle diameter of the polymer to be produced can thus be regulated by controlling the mean particle diameter of the said porous solid support.

EXAMPLE 4 a—Preparation of the Active Solid Hydrocarbon Using a Transition Metal Component of Fine Grain Size 200 g of a porous solid support consisting of a low density polyethylene powder having a grain size of between 100 and 160 microns and a mean particle diameter of about 140 microns, and 10.7 g of pure THA in the form of a liquid, were introduced into a dried 1 liter flask, which was kept under a nitrogen atmosphere, and the components were homogenised under a nitrogen atmosphere.

8.3 g of a component based on TiCl$_4$ which is obtained by combination of TiCl$_4$ and MgCl$_2$ in the presence of ethyl benzoate in heptane, the said component containing, by weight, 1.7% of titanium, 7% of ethyl benzoate and 10% of hexane and being in the form of particles having a mean diameter of about 10 microns, were then added to the product obtained, under a nitrogen atmosphere.

The resulting mixture was then homogenised under nitrogen to give a pulverulent composition in which the ratio of the number of atoms of aluminium originating from the THA to the number of atoms of titanium was equal to 12.1:1.

The pulverulent composition obtained was transferred into a reactor equipped with a stirrer revolving at a speed of 400 revolutions/minute, the said reactor being kept at a temperature of 70° C. under a nitrogen pressure of 1 bar.

When this operation had ended, further nitrogen was injected into the reactor, followed by hydrogen, until partial pressures equal to 5.5 bar for nitrogen and 0.5 bar for hydrogen were reached.

Ethylene and but-1-ene were then passed into the said reactor, which was still kept at 70° C., for 30 minutes at flow rates such that the molar ratio of but-1-ene:ethylene, at the entry into the reactor, was equal to 0.0466:1 and the flow rate of ethylene represented 100 liters/hour, and injection of ethylene and but-1-ene was then continued for 3.5 hours with a flow rate of ethylene equal to 200 liters/hour and a molar ratio of but-1-ene:ethylene equal to 0.0466:1.

After a period of 2.5 hours after the start of injection of the olefines, 22 ml of THA were introduced into the reactor with the aid of a metering pump, this injection being carried out in the course of 30 minutes.

After an olefine injection time equal to 4 hours, the polymerisation was stopped by decompression of the reactor and the said reactor was then flushed under nitrogen, with cooling.

1,280 g of an active solid hydrocarbon were obtained in the form of a powder, which was stored in a glove box under an inert atmosphere.

This polymeric active solid hydrocarbon had the following characteristics:

| Content of Ti (ppm, by weight) | 116 |
|---|---|
| Content of Al (ppm, by weight) | 2,100 |
| Density | 0.922 |
| Mean particle diameter (microns) | 170 |
| Bulk density of the heaped product (g/cm$^3$) | 0.454 |
| Melt index (MI$^{2.16}_{190°\ C.}$) | 4.2 | b—Gas Phase Polymerisation of a Mixture of Ethylene and but-1-ene in Contact with the Active Solid Hydrocarbon to Form an Ethylene/but-1-ene Copolymer (LLDPE)

The polymerisation was carried out in a reactor equipped with a stirrer revolving at a speed of rotation of 400 revolutions/minute, the temperature being kept at 85° C. throughout the polymerisation.

But-1-ene was first injected into the dried reactor, which was kept under vacuum, until a pressure of 1 bar was obtained, 0.9 ml of pure THA was then injected in and the injection of but-1-ene was continued until a pressure of 2 bar was obtained. Hydrogen and ethylene were then injected successively into the reactor until the partial pressures of hydrogen and ethylene obtained were equal to, respectively, 1.5 bar and 13 bar.

16.8 g of the active solid hydrocarbon obtained as indicated in section a of this example were then introduced into the said reactor, this introduction being effected by forcing in with nitrogen, the injection of nitrogen being continued until the total pressure inside the reactor had reached 21 bar. The pressure in the reactor was then kept at this value by injection of ethylene and but-1-ene in a molar ratio of but-1-ene to ethylene equal to 0.0466:1.

After a reaction time of 4 hours, the polymerisation was stopped by decompression of the reactor, flushing with nitrogen and cooling of the said reactor.

1,180 g of ethylene/but-1-ene copolymer (LLDPE), the characteristics of which are given below, were collected.

| Content of Ti (ppm, by weight) | 1.65 |
|---|---|
| Content of Al (ppm, by weight) | 88 |
| Density | 0.9265 |
| Mean particle diameter (microns) | 410 |
| Bulk density of the heaped product (g/cm$^3$) | 0.394 |
| Melt index (MI$^{2.16}_{190°\ C.}$) | 0.14 |

EXAMPLE 5 a—Preparation of the Active Solid Hydrocarbon Using a Liquid Phase Based on Triethyl-Aluminium The preparation was carried out in a reactor equipped with a stirrer revolving at a speed of 340 revolutions/minute, the temperature being kept at 90° C. throughout the preparation of the active solid hydrocarbon.

300 g of a porous solid support consisting of a linear low density polyethylene powder having a mean particle diameter equal to 510 microns were introduced into the dried reactor, which was kept under a nitrogen pressure equal to 1 bar, followed by 90 ml of a 187 g/liter solution of triethyl-aluminium (abbreviated to TEA) in heptane, the components were homogenised under a nitrogen atmosphere and the mixture was then placed under vacuum in order to evaporate off the heptane.

7.2 g of the component containing $TiCl_4$ used in Example 1 were then added to the contents of the reactor, by forcing in with nitrogen, and the injection of nitrogen was continued until a pressure of 10 bar was obtained, whilst the mixture contained in the reactor was homogenised, to give a pulverulent composition in which the ratio of the number of atoms of aluminium originating from the TEA to the number of atoms of titanium was equal to 52.3:1.

Ethylene and but-1-ene were then passed into the reactor at flow rates such that the molar ratio of but-1-ene:ethylene was equal to 0.0466:1 at the entry into the reactor, and the flow rate of ethylene represented 310 liters/hour, injection of the olefines being continued for 3.5 hours.

At the end of this period, the polymerisation was stopped by decompression of the reactor followed by flushing under nitrogen and cooling of the said reactor.

1,600 g of an active solid hydrocarbon were collected in the form of a powder, which was stored in a glove box under an inert atmosphere.

This active solid hydrocarbon had the following characteristics:

| | |
|---|---|
| Content of Ti (ppm, by weight) | 81 |
| Content of Al (ppm, by weight) | 2,387 |
| Density | 0.918 |
| Mean particle diameter (microns) | 720 |
| Melt index ($MI_{190° C.}^{2.16}$) | 0.02 | b—Gas Phase Polymerisation of a Mixture of Ethylene and but-1-ene in Contact with the Active Solid Hydrocarbon to give an Ethylene/but-1-ene Copolymer (LLDPE)

The polymerisation was carried out in a reactor equipped with a stirrer revolving at a speed of rotation of 400 revolutions/minute, the temperature being kept at 85° C. throughout the polymerisation.

9 ml of a 187 g/liter solution of TEA in heptane were introduced into the dried reactor, which was kept under a nitrogen pressure of 1 bar, and the heptane was evaporated off in vacuo.

But-1-ene, hydrogen and ethylene were then injected successively into the reactor until the pressures of but-1-ene, hydrogen and ethylene obtained were equal to, respectively, 2 bar, 3 bar and 12 bar, and 40 g of the active solid hydrocarbon obtained as indicated in section a of this example were then introduced into the said reactor, this introduction being carried out by forcing in with nitrogen and the injection of nitrogen being continued until the total pressure inside the reactor had reached 21 bar. The pressure in the reactor was subsequently kept at this value by injection of ethylene and but-1-ene in a molar ratio of but-1-ene:ethylene equal to 0.0466:1, the said injection being continued for a period of 3.5 hours.

At the end of this period, the polymerisation was stopped by decompression of the reactor, flushing with nitrogen and cooling of the said reactor.

1,104 g of ethylene/but-1-ene copolymer (LLDPE) having the following characteristics were obtained:

| | |
|---|---|
| Content of Ti (ppm, by weight) | 2.93 |
| Content of Al (ppm, by weight) | 432 |
| Density | 0.9285 |
| Mean particle diameter (microns) | 980 |
| Bulk density of the heaped product (g/cm$^3$) | 0.344 |
| Melt index ($MI_{190° C.}^{2.16}$) | 2.7 |

EXAMPLE 6 a—Preparation of the Active Solid Hydrocarbon 200 g of a porous solid support consisting of low density polyethylene powder having a grain size of between 100 and 160 microns and a mean particle diameter of 125 microns, and 12.45 g of pure THA were introduced into a dried 1 liter flask, which was kept under a nitrogen atmosphere, and the components were homogenised under a nitrogen atmosphere. 11.6 g of the component based on $TiCl_4$ used in Example 1 were then added to the product obtained, under a nitrogen atmosphere. The resulting mixture was then homogenised under nitrogen to give a pulverulent composition in which the ratio of the number of atoms of aluminium originating from the THA to the number of atoms of titanium was equal to 10:1.

The pulverulent composition obtained was transferred into a reactor equipped with a stirrer revolving at a speed of 350 revolutions/minute, the reactor being kept at a temperature of 70° C. under a nitrogen atmosphere. This transfer was carried out by forcing in with nitrogen, the injection of nitrogen being continued until a nitrogen pressure of 5.5 bar was obtained. Hydrogen was subsequently injected into the reactor until a hydrogen pressure equal to 0.5 bar was obtained.

Ethylene and but-1-ene were then passed into the said reactor, which was still kept at 70° C., for 30 minutes at flow rates such that the molar ratio of but-1-ene:ethylene at the entry into the reactor was equal to 0.0466:1 and the flow rate of ethylene represented 100 liters/hour, and injection of ethylene and but-1-ene was then continued for 3.5 hours at a flow rate of ethylene equal to 200 liters/hour and a molar ratio of but-1-ene:ethylene still equal to 0.0466:1.

Starting from the third hour, 48 g of THA were also introduced into the reactor at a rate of 2 ml/minute.

After an olefine injection period equal to 4 hours, the polymerisation was stopped by decompression of the reactor and flushing under nitrogen and cooling of the said reactor.

1,309 g of an active solid hydrocarbon were collected in the form of a powder, which was stored in a glove box under an inert atmosphere.

This active solid hydrocarbon had the following characteristics:

| | |
|---|---|
| Content of Ti (ppm, by weight) | 159 |
| Content of Al (ppm, by weight) | 4,386 |
| Density | 0.9263 |
| Mean particle diameter (microns) | 270 |
| Bulk density of the heaped product (g/cm$^3$) | 0.401 |

-continued

| Melt index ($MI^{2.16}_{190° C.}$) | 2.2 |
|---|---| b—Gas Phase Polymerisation of a Mixture of Ethylene and but-1-ene in Contact with the Active Solid Hydrocarbon Modified by an Electron Donor, giving an Ethylene/but-1-ene Copolymer (LLDPE)

The polymerisation was carried out in a reactor equipped with a stirrer revolving at a speed of rotation of 370 revolutions/minute, the temperature being kept at 80° C. throughout the polymerisation.

1.8 bar of but-1-ene, 1.5 bar of hydrogen and 13.5 bar of ethylene were injected successively into the dried reactor, which was kept under vacuum. 18.1 g of the active solid hydrocarbon obtained as indicated in section a of this example were then introduced into the said reactor, this amount of the active solid hydrocarbon having first been impregnated with 1 ml of a solution obtained by dissolving 1.3 g of vinyl acetate in 60 ml of isopentane, the vinyl acetate acting as an electron donor. This introduction of the active solid hydrocarbon into the reactor was carried out by forcing in with nitrogen, the introduction of nitrogen being continued to achieve a nitrogen pressure equal to 4.2 bar. The ratio of the number of atoms of aluminium to the number of moles of vinyl acetate in the reactor was equal to 11.65:1, whilst the ratio of the number of atoms of Al to the number of atoms of Ti was equal to 49.4:1. The pressure in the reactor was subsequently kept at the value of 21 bar by injection of ethylene and but-1-ene in a molar ratio of but-1-ene:ethylene equal to 0.0466:1, this injection being continued for 2 hours and 15 minutes.

At the end of this period, the polymerisation was stopped by decompression of the reactor, flushing with nitrogen and cooling of the said reactor.

The polymerisation started immediately after introduction of the active solid hydrocarbon and the maximum activity achieved corresponded to 535,000 g of polymer per gramme of titanium and per hour.

620 g of ethylene/but-1-ene copolymer (LLDPE), the characteristics of which are given below, were collected:

| Content of Ti (ppm, by weight) | 4.6 |
|---|---|
| Content of Al (ppm, by weight) | 128 |
| Density | 0.923 |
| Mean particle diameter (microns) | 900 |
| Bulk density of the heaped product (g/cm$^3$) | 0.316 |
| Melt index ($MI^{2.16}_{190° C.}$) | 0.61 |

By way of comparison, this experiment was repeated without using vinyl acetate and with an amount of active solid hydrocarbon equal to 15 g, the polymerisation being stopped after 4 hours and the other operating conditions otherwise remaining the same.

Immediate start-up of the polymerisation was observed after introduction of the active solid hydrocarbon and the maximum activity reached a value of 900,000 g of polymer per gramme of titanium and per hour.

In the course of this comparative experiment, 1,245 g of ethylene/but-1-ene copolymer (LLDPE) having the following characteristics were collected:

| Content of Ti (ppm, by weight) | 1.91 |
|---|---|
| Content of Al (ppm, by weight) | 53 |
| Density | 0.922 |
| Mean particle diameter (microns) | 1,200 |
| Bulk density of the heaped product (g/cm$^3$) | 0.340 |
| Melt index ($MI^{2.16}_{190° C.}$) | 0.8 |

The use of an electron donor, in this case vinyl acetate, leads to a maximum activity which is lower than that obtained in the absence of an electron donor, which permits easier control of the said activity and consequently of the progress of the polymerisation.

EXAMPLE 7 a—Preparation of the Active Solid Hydrocarbon 200 g of a porous solid support consisting of a low density polyethylene powder having a grain size between 160 and 250 microns and a mean particle diameter of 210 microns, and 12.7 g of pure THA, were introduced into a dried 1 liter flask, which was kept under a nitrogen atmosphere, and the components were homogenised under a nitrogen atmosphere.

10.3 g of the component based on TiCl$_4$ described in Example 1 were then added to the product obtained, under a nitrogen atmosphere. The resulting mixture was then homogenised under nitrogen to give a pulverulent composition in which the ratio of the number of atoms of aluminium originating from the THA to the number of titanium atoms was equal to 11.54:1.

The pulverulent composition obtained was transferred into a reactor equipped with a stirrer revolving at a speed of 400 revolutions/minute, the reactor being kept at a temperature of 70° C. under a nitrogen atmosphere. This transfer was carried out by forcing in with nitrogen, the injection of nitrogen being continued until a nitrogen pressure of 5 bar was obtained. Hydrogen was subsequently injected into the reactor until a hydrogen pressure equal to 0.5 bar was obtained.

Ethylene and but-1-ene were subsequently passed into the reactor, which was still kept at 70° C., for 30 minutes at flow rates such that the molar ratio of but-1-ene:ethylene at the entry into the reactor was equal to 0.0466:1 and the flow rate of ethylene represented 100 liters/hour, and the injection of ethylene and but-1-ene was then continued at a flow rate of ethylene equal to 200 liters/hour and a molar ratio of but-1-ene:ethylene still equal to 0.0466:1.

After a total period of injection of olefines into the reactor equal to 2 hours, the polymerisation was stopped by decompression of the reactor and then flushing under nitrogen and cooling of the said reactor.

670 g of a pulverulent active solid hydrocarbon were collected and were stored in a glove box under an inert atmosphere.

This active solid hydrocarbon had the following characteristics:

| Content of Ti (ppm, by weight) | 276 |
|---|---|
| Content of Al (ppm, by weight) | 1,800 |
| Density | 0.927 |
| Mean particle diameter (microns) | 270 |
| Bulk density of the heaped product (g/cm$^3$) | 0.396 |
| Melt index ($MI^{2.16}_{190° x.}$) | 8.75 | b—Gas Phase Polymerisation of a Mixture of Ethylene and but-1-ene in Contact with the Active Solid Hydrocarbon Modified by an Electron Donor, to give LLDPE The polymerisation was carried out in a reactor equipped with a stirrer revolving at a speed of rotation of 400 revolutions/minute, the temperature being kept at 85° C. throughout the polymerisation.

Outside the reactor, 3 ml of a 236 g/liter solution of THA in heptane were first reacted with 1.3 ml of a 150 g/liter solution of methylparatoluate (abbreviated to MPT) in heptane at the ambient temperature, and the reaction product was mixed with 5.2 g of the active solid hydrocarbon obtained as described in section a of this example.

2.8 bar of but-1-ene, 1.8 bar of hydrogen and 12.4 bar of ethylene were injected successively into the dried reactor, which was kept under vacuum. The modified active solid hydrocarbon prepared as indicated above was then introduced into the said reactor, this introduction being carried out by forcing in with nitrogen, the introduction of nitrogen being continued until a nitrogen pressure equal to 4 bar was obtained.

4 ml of the 236 g/liter solution of THA in heptane were then added to the reactor, giving a ratio of the number of atoms of aluminium to the number of molecules of MPT in the reactor equal to 4.7:1, whilst the ratio of the number of atoms of Al to the number of atoms of Ti was equal to 206:1. The reaction started up gently and the pressure in the reactor was kept at the value of 21 bar by injection of ethylene and but-1-ene in a molar ratio of but-1-ene:ethylene equal to 0.466:1, this injection being continued for 3.5 hours.

At the end of this period, the polymerisation was stopped by decompression of the reactor, flushing with nitrogen and cooling of the said reactor.

In the course of this experiment, 910 g of ethylene/but-1-ene copolymer (LLDPE) having the following characteristics were collected:

| | |
|---|---|
| Content of Ti (ppm, by weight) | 1.57 |
| Content of Al (ppm, by weight) | 182 |
| Density | 0.922 |
| Mean particle diameter (microns) | 1,700 |
| Bulk density of the heaped product (g/cm$^3$) | 0.371 |
| Melt index (MI$^{2.16}_{190°\ C.}$) | 0.1 |

By way of comparison, this experiment was repeated without using the MPT, the other operating conditions remaining the same.

The polymerisation reaction started up violently and a maximum activity of about twice that obtained in the presence of MPT was achieved.

It can again be seen that the use of an electron donor, in this case MPT, permits control of the maximum activity of the catalytic system and consequently of the progress of the polymerisation.

EXAMPLE 8 a—Preparation of the Active Solid Hydrocarbon Using Ethylene and Hex-1-ene as the Olefines The preparation was carried out as described in section a of Example 7, but using 16 ml of pure THA and 9.9 g of the component based on TiCl$_4$ in the preparation of the pulverulent composition, and replacing the but-1-ene with hex-1-ene in an amount such that the molar ratio of hex-1-ene:ethylene at the entry into the reactor was equal to 0.025:1 in the course of each of the phases of injection of the olefines into the reactor, the polymerisation being stopped after a total olefine injection period equal to 4 hours.

1,200 g of a pulverulent active solid hydrocarbon were collected, and were stored in a glove box under an inert atmosphere.

This active solid hydrocarbon had the following characteristics:

| | |
|---|---|
| Content of Ti (ppm, by weight) | 148 |
| Content of Al (ppm, by weight) | 1,013 |
| Density | 0.922 |
| Mean particle diameter (microns) | 255 |
| Bulk density of the heaped product (g/cm$^3$) | 0.358 |
| Melt index (MI$^{2.16}_{190°\ C.}$) | 1.45 | b—Gas Phase Polymerisation of a Mixture of Ethylene and But-1-ene in Contact with the Active Solid Hydrocarbon to give LLDPE The polymerisation was carried out in a reactor equipped with a stirrer revolving at a speed of rotation of 400 revolutions/minute, the temperature being kept at 85° C. throughout the polymerisation.

3.2 bar of but-1-ene, 1.8 bar of hydrogen and 12 bar of ethylene were injected successively into the dried reactor, which was kept under vacuum. 14 g of the active solid hydrocarbon obtained as indicated in section a of this example were then introduced into the said reactor, this introduction being carried out by forcing in with nitrogen, the introduction of nitrogen being continued until a total pressure of 21 bar was achieved in the reactor.

3 ml of a 236 g/liter solution of THA in heptane were then added to the reactor, in order to start up the reaction, and the pressure in the reactor was then kept at a value of 21 bar by injection of ethylene and but-1-ene in a molar ratio of but-1-ene:ethylene equal to 0.0466:1. The ratio of the number of atoms of Al to the number of atoms of Ti in the reaction mixture contained in the reactor was equal to 71:1.

The injection of the olefines into the reactor was continued for a period of 4 hours, and the polymerisation was then stopped by decompression of the reactor, flushing with nitrogen and cooling of the said reactor.

1,650 g of ethylene/but-1-ene copolymer (LLDPE) having the following characteristics were collected:

| | |
|---|---|
| Content of Ti (ppm, by weight) | 1.25 |
| Content of Al (ppm, by weight) | 50 |
| Density | 0.920 |
| Mean particle diameter (microns) | 1,500 |
| Density of the heaped product (g/cm$^3$) | 0.355 |
| Melt index (MI$^{2.16}_{190°\ C.}$) | 0.95 | c—Gas Phase Polymerisation of a Mixture of Ethylene and But-1-ene in Contact with the Aged Active Solid Hydrocarbon to give LLDPE The polymerisation was carried out in a reactor equipped with a stirrer revolving at a speed of rotation of 400 revolutions/minute, the temperature being kept at 85° C. throughout the polymerisation.

2.8 bar of but-1-ene, 1.8 bar of hydrogen and 12.4 bar of ethylene were injected successively into the dried reactor, which was kept under vacuum, and 1 ml of a solution of 80% by weight of isoprenylaluminium in heptane was then injected in. 18 g of the active solid hydrocarbon obtained by ageing for two months in a glove box under a nitrogen atmosphere, the active solid hydrocarbon being prepared as indicated in section a of this example, were then introduced into the said reactor, this introduction being carried out by forcing in with nitrogen, and the introduction of nitrogen being continued until a nitrogen pressure equal to 4 bar was obtained. The pressure in the reactor was then kept at a value of 21 bar by injection of ethylene and but-1-ene in a molar ratio of but-1-ene:ethylene equal to 0.0466 at the entry into the reactor. The ratio of the number of atoms of Al to the number of atoms of Ti in the reaction mixture contained in the reactor was equal to 79.

The injection of the olefines into the reactor was continued for 4 hours and the polymerisation was then stopped by decompression of the reactor, flushing with nitrogen and cooling of the said reactor.

2,050 g of ethylene/but-1-ene copolymer (LLDPE) having the following characteristics were collected:

| | |
|---|---|
| Content of Ti (ppm, by weight) | 1.29 |
| Content of Al (ppm, by weight) | 57 |
| Density | 0.921 |
| Mean particle diameter (microns) | 1.400 |
| Bulk density of the heaped product (g/cm$^3$) | 0.508 |
| Melt index (MI$_{190°\ C.}^{2.16}$) | 0.97 |

EXAMPLE 9 a—Preparation of the Active Solid Hydrocarbon Using Ethylene as the only Olefine 187 g of a porous solid support consisting of a low density polyethylene powder having a grain size of between 100 and 160 microns and a mean particle diameter of 140 microns, and 13.5 g of pure THA, were introduced into a dried 1 liter flask, which was kept under a nitrogen atmosphere, and the components were homogenised under a nitrogen atmosphere.

12.07 g of the component based on TiCl$_4$ described in Example 1 were then added to the product obtained, under a nitrogen atmosphere. The resulting mixture was then homogenised under nitrogen to give a pulverulent composition in which the ratio of the number of atoms of Al originating from the THA to the number of atoms of Ti was equal to 10.47:1.

The pulverulent composition obtained was transferred into a reactor equipped with a stirrer revolving at a speed of 400 revolutions/minute, the reactor being kept at a temperature of 70° C. under a nitrogen atmosphere. This transfer was carried out by forcing in with nitrogen, the injection of nitrogen being continued until a nitrogen pressure of 4.5 bar was obtained. Hydrogen was then injected into the reactor until a hydrogen pressure equal to 0.5 bar was obtained.

Ethylene was subsequently passed into the reactor, which was still kept at 70° C., at a flow rate of 120 liters/hour for 30 minutes and thereafter at 220 liters/hour.

Two hours after the start of the injection of ethylene, 25 ml of pure THA were added to the contents of the reactor.

After a total ethylene injection period equal to 4 hours, the polymerisation was stopped by decompression of the reactor and then flushing under nitrogen and cooling of the said reactor.

1,165 g of active solid hydrocarbon were collected in the form of a powder, which was stored in a glove box under an inert atmosphere.

This active solid hydrocarbon had the following characteristics:

| | |
|---|---|
| Content of Ti (ppm, by weight) | 186 |
| Content of Al (ppm, by weight) | 2,731 |
| Mean particle diameter (microns) | 350 |
| Bulk density of the heaped product (g/cm$^3$) | 0.351 |
| Melt index (MI$_{190°\ C.}^{2.16}$) | 0.18 |
| Density | 0.960 | b—Gas Phase Polymerisation of a Mixture of Ethylene and But-1-ene in Contact with the Active Solid Hydrocarbon to give LLDPE The polymerisation was carried out in a reactor equipped with a stirrer revolving at a speed of rotation of 400 revolutions/minute, the temperature being kept at 85° C. throughout the polymerisation.

3 bar of but-1-ene, 2 bar of hydrogen and 12 bar of ethylene were injected successively into the dried reactor, which was kept under vacuum. 17 g of the active solid hydrocarbon prepared as indicated in section a of this example were then introduced into the reactor, after 0.6 ml of pure THA and 2 ml of a 115 g/liter solution of MPT in heptane had first been deposited onto the said amount of the active solid hydrocarbon, the said introduction being carried out by forcing in with nitrogen and the introduction of nitrogen being continued until a total pressure of 21 bar was obtained in the reactor.

11 ml of a 118 g/liter solution of triF-boctyl-aluminium in heptane were then added to the reactor, which gave a ratio of the number of atoms of Al to the number of atoms of Ti equal to 106:1, whilst the ratio of the number of atoms of Al to the number of molecules of MPT was equal to 4.57:1.

After the addition of the amount of tri-n-octyl-aluminium, the polymerisation reaction started up gently, and the total pressure in the reactor was kept at a value of 21 bar by injection of ethylene and but-1-ene in a molar ratio of but-1-ene:ethylene at the entry into the reactor equal to 0.0466:1.

After an olefine injection period equal to 4 hours, in the course of which the polymerisation progressed in a stable manner, the polymerisation was stopped by decompression of the reactor, flushing with nitrogen and cooling of the said reactor.

1,740 g of ethylene/but-1-ene copolymer (LLDPE) having the following characteristics were collected:

| | |
|---|---|
| Content of Ti (ppm, by weight) | 1.81 |
| Content of Al (ppm, by weight) | 109 |
| Mean particle diameter (microns) | 840 |
| Density | 0.919 |
| Bulk density of the heaped product (g/cm$^3$) | 0.462 |
| Melt index (MI$_{190°\ C.}^{2.16}$) | 1.1 |

The use of methylparatoluate as an electron donor in this case again permits control of the activity of the polymerisation reaction from its start and thus permits a steady progress of this polymerisation to be ensured.

EXAMPLE 10 a—Preparation of the Active Solid Hydrocarbon Using a Component Based on TiCl4 Containing Silica 100 g of a porous solid support consisting of a low density polyethylene powder having a grain size of between 160 and 250 microns and a mean particle diameter of about 200 microns, and 31 ml of pure THA, were introduced into a dried 1 liter flask, which was kept under a nitrogen atmosphere, and the components were homogenised under a nitrogen atmosphere.

42.2 g of a component based on TiCl4 and containing, by weight, 1.3% of titanium, 3.3% of magnesium and 10.2% of chlorine, the rest comprising silica in the form of a gel, were then added to the product obtained, under a nitrogen atmosphere. The resulting mixture was then homogenised under nitrogen to give a pulverulent composition in which the ratio of the number of atoms of Al to the number of atoms of Ti was equal to 7.62:1.

The pulverulent composition obtained was transferred into a reactor equipped with a stirrer revolving at a speed of 400 revolutions/minute, the reactor being kept at a temperature of 70° C. under a nitrogen atmosphere. This transfer was carried out by forcing in with nitrogen, the injection of nitrogen being continued until a nitrogen pressure of 5 bar was obtained. Hydrogen was subsequently injected into the reactor until a hydrogen pressure equal to 0.7 bar was obtained.

Ethylene and but-1-ene were then passed into the reactor, which was still kept at 70° C., at flow rates such that the molar ratio of but-1-ene:ethylene at the entry into the reactor was equal to 0.0466:1 and the flow rate of ethylene represented 200 liters/hour.

After a total period of injection of the olefines into the reactor equal to 70 minutes, the polymerisation was stopped by decompression of the reactor and then flushing under nitrogen and cooling of the said reactor.

454 g of a pulverulent active solid hydrocarbon were collected and were stored in a glove box under an inert atmosphere.

This active solid hydrocarbon had the following characteristics:

| Content of Ti (ppm, by weight) | 1,208 |
| --- | --- |
| Mean particle diameter (microns) | 310 |
| Bulk density of the heaped product (g/cm$^3$) | 0.449 | b—Gas Phase Polymerisation of a Mixture of Ethylene and But-1-ene in Contact with the Active Solid Hydrocarbon to give LLDPE The polymerisation was carried out in a reactor equipped with a stirrer revolving at a speed of rotation of 400 revolutions/minute, the temperature being kept at 85° C. throughout the polymerisation.

20 g of LLDPE powder obtained from a previous preparation were first introduced into the dried reactor, which was kept under vacuum, and 3 bar of but-1-ene, 2 bar of hydrogen and 12 bar of ethylene were then successively introduced. 4 g of the active solid hydrocarbon prepared as indicated in section a of this example were then introduced into the said reactor, this introduction being carried out by forcing in with nitrogen, the injection of nitrogen being continued until a total pressure of 21 bar was obtained in the reactor. The total pressure of the reactor was then kept at this value by injection of ethylene and but-1-ene in a molar ratio of but-1-ene:ethylene equal to 0.0466:1.

After 4 hours of injection of the olefines, the polymerisation was stopped as indicated in the preceding Examples.

1,070 g of ethylene/but-1-ene copolymer (LLDPE) having the following characteristics were obtained:

| Content of SiO$_2$ (ppm, by weight) | 296 |
| --- | --- |
| Mean particle diameter (microns) | 1,000 |
| Density | 0.918 |
| Bulk density of the heaped product (g/cm$^3$) | 0.402 |
| Melt index (MI$_{190°\ C.}^{2.16}$) | 2.7 |

EXAMPLE 11 a—Preparation of the Active Solid Hydrocarbon Using Isoprenyl-aluminium as the Organoaluminium Compound 150 g of a porous solid support consisting of a low density polyethylene powder having a grain size of less than 250 microns and a mean particle diameter equal to 150 microns, and 12 ml of a solution of 80% by weight of isoprenyl-aluminium (abbreviated to IPRA) in heptane, were introduced into a dried 1 liter flask, which was kept under a nitrogen atmosphere, and the components were homogenised under a nitrogen atmosphere.

12 g of the component based on TiCl4 defined in Example 1 were added to the product obtained. The resulting mixture was then homogenised under nitrogen to give a pulverulent composition in which the ratio of the number of atoms of Al to the number of atoms of Ti was equal to 9.87:1.

The pulverulent composition obtained was transferred into a reactor equipped with a stirrer revolving at a speed of 350 revolutions/minute, the reactor being kept at a temperature of 70° C. under a nitrogen atmosphere. This transfer was carried out by forcing in with nitrogen, the injection of nitrogen being continued until a nitrogen pressure equal to 5 bar was obtained. Hydrogen was subsequently injected into the reactor until a hydrogen pressure equal to 0.5 bar was obtained.

Ethylene and but-1-ene were then passed into the reactor, which was still kept at 70° C., for 30 minutes at flow rates such that the molar ratio of but-1-ene:ethylene at the entry into the reactor was equal to 0.0466:1 and the flow rate of ethylene represented 100 liters/hour, and injection of ethylene and but-1-ene was then continued at a flow rate of ethylene increased to 200 liters/hour and a molar ratio of but-1-ene:ethylene still equal to 0.0466:1.

After a total period of injection of the olefines into the reactor equal to 3.75 hours, the polymerisation was stopped as indicated in the preceding examples.

1,020 g of a pulverulent active solid hydrocarbon were collected and were stored in a glove box under an inert atmosphere.

This active solid hydrocarbon had the following characteristics:

| Content of Ti (ppm, by weight) | 221 |
| --- | --- |
| Content of Al (ppm, by weight) | 1,178 |
| Mean particle diameter (microns) | 250 |
| Bulk density of the heaped | 0.395 |

-continued

| | |
|---|---|
| product (g/cm³) | |
| Density | 0.9215 |
| Melt index (MI$^{2.16}_{190°}$ C.) | 2 | b—Gas Phase Polymerisation of a Mixture of Ethylene and But-1-ene in Contact with the Active Solid Hydrocarbon to give LLDPE Polymerisation was carried out in a reactor equipped with a stirrer revolving at a speed of rotation of 400 revolutions/minute, the temperature being kept at 85° C. throughout the polymerisation.

20 g of a linear low density polyethylene having a mean particle diameter of about 800 microns were introduced into the dried reactor and, after the said reactor had been placed under vacuum, 1 bar of but-1-ene, 5.33 ml of a 200 g/liter of solution of IPRA in heptane, 2 bar of but-1-ene, 1.8 bar of hydrogen and finally 12.2 bar of ethylene were successively injected into the reactor. 16.5 g of the active solid hydrocarbon obtained as indicated in section a of this example were then introduced into the reactor, this introduction being carried out by forcing in with nitrogen, the injection of nitrogen being continued until a total pressure in the reactor equal to 21 bar was obtained. The total pressure in the reactor was then kept at this value by injection of ethylene and but-1-ene in a molar ratio of but-1-ene:ethylene of 0.0466:1.

After 2 hours injection of the olefines, the polymerisation was stopped as described in the preceding examples.

1,550 g of ethylene/but-1-ene copolymer (LLDPE) having the following characteristics were collected:

| | |
|---|---|
| Content of Ti (ppm, by weight) | 2.24 |
| Content of Al (ppm, by weight) | 111 |
| Mean particle diameter (microns) | 1,500 |
| Density | 0.9175 |
| Bulk density of the heaped product (g/cm³) | 0.398 |
| Melt index (MI$^{2.16}_{190°}$ C.) | 1.3 |

The copolymer obtained after 2 hours of polymerisation contained only 2.24 ppm of Ti, which shows that the use of IPRA in conjunction with the active solid hydrocarbon improves the average activity of the catalytic system, that is to say the amount of polymer produced per gramme of Ti and per hour.

In addition, the density of the copolymer obtained in the presence of IPRA is lower than that of a similar copolymer obtained in the absence of IPRA, which also shows that IPRA permits better incorporation of the alpha-olefine associated with ethylene in the course of the copolymerisation.

c—Preparation of an ethylene/but-1-ene/hex-1-ene terpolymer

The preparation was carried out in a reactor equipped with a stirrer revolving at a speed of rotation of 400 revolutions/minute, the temperature being kept at 85° C. throughout the polymerisation.

20 g of a linear low density polyethylene having a mean particle diameter of about 800 microns were introduced into the dried reactor, and, after the said reactor had been placed under vacuum, 1 bar of a mixture of but-1-ene and hex-1-ene in a weight ratio of hex-1-ene:-but-1-ene equal to 0.168:1 and then 1.01 g of THA, 2 bar of the mixture of but-1-ene and hex-1-ene, 1.5 bar of hydrogen and finally 12.5 bar of ethylene were injected in successively. 10 g of the active solid hydrocarbon obtained as described in section a of this example were then introduced into the reactor, this introduction being carried out by forcing in with nitrogen, the injection of nitrogen being continued until a total pressure in the reactor equal to 21 bar was obtained. The pressure was subsequently kept at this value by injecting in, per hour, 1,000 liters of gaseous ethylene and 185 ml of a liquid mixture of but-1-ene and hex-1-ene in a weight ratio of hex-1-ene:but-1-ene equal to 0.168.

After 3.5 hours of injection of the olefines, the polymerisation was stopped as indicated in the preceding examples.

1,050 g of ethylene/but-1-ene/hex-1-ene terpolymer having the following characteristics were collected:

| | |
|---|---|
| Content of Ti (ppm, by weight) | 2 |
| Content of Al (ppm, by weight) | 102 |
| Mean particle diameter (microns) | 1,200 |
| Density | 0.916 |
| Bulk density of the heaped product (g/cm³) | 0.403 |
| Melt index (MI$^{2.16}_{190°}$ C.) | 0.75 |

EXAMPLE 12 a—Preparation of the Active Solid Hydrocarbon Using a Component Based on TiCl$_4$ of Small Grain Size 170 g of a porous solid support consisting of a low density polyethylene powder having a grain size of less than 250 microns and a mean particle diameter equal to 150 microns, and 11.8 g of pure THA, were introduced into a dried 1 liter flask, which was kept under a nitrogen atmosphere, and the components were homogenised under a nitrogen atmosphere.

4.91 g of a component based on TiCl$_4$ obtained starting from TiCl$_4$ and MgCl$_2$ and having a mean particle diameter of 15 microns, the said component containing, by weight, 9.5% of Ti and 9.9% of Mg, were then added to the product obtained, under a nitrogen atmosphere. The resulting mixture was then homogenised under nitrogen to give a pulverulent composition in which the ratio of the number of atoms of Al to the number of atoms of Ti was equal to 4.26.

The pulverulent composition obtained was transferred into a reactor equipped with a stirrer revolving at a speed of 350 revolutions/minute, the reactor being kept at a temperature of 70° C. under a nitrogen atmosphere. This transfer was carried out by forcing in with nitrogen, the injection of nitrogen being continued until a nitrogen pressure of 5.5 bar was obtained in the reactor. 0.5 bar of hydrogen was subsequently injected into the said reactor.

Ethylene and but-1-ene were subsequently passed into the reactor, which was still kept at 70° C., for 30 minutes at flow rates such that the molar ratio of but-1-ene:ethylene at the entry into the reactor was equal to 0.0466:1 and the flow rate of ethylene represented 100 liters/hour, and injection of but-1-ene and ethylene was then continued at a flow rate of ethylene increased to 200 liters/hour and a molar ratio of but-1-ene:ethylene still equal to 0.0466:1.

After a total olefine injection period equal to 4 hours, the polymerisation was stopped as indicated in the preceding examples.

1,261 g of a pulverulent active solid hydrocarbon were collected and were stored in a glove box under an inert atmosphere.

The active solid hydrocarbon obtained had the following characteristics:

| Content of Ti (ppm, by weight) | 370 |
|---|---|
| Content of Al (ppm, by weight) | 889 |
| Mean particle diameter (microns) | 360 |
| Density | 0.9205 |
| Bulk density of the heaped product (g/cm$^3$) | 0.521 |
| Melt index (MI$_{190° C.}^{2.16}$) | 20.6 |

As can be seen from this example and from Example 4, the use of a transition metal component having a small grain size in the preparation of the active solid hydrocarbon permits a considerable increase in the bulk density of the said active solid hydrocarbon, which, conseqently, can also permit an increase in the bulk density of the polymers obtained by polymerisation of one or more olefines by means of the said active solid hydrocarbon of increased bulk density.

b—Preparation of an Ethylene/but-1-ene/hex-1-ene Terpolymer

The preparation was carried out as described in section c of Example 11, but using 10.5 g of the active solid hydrocarbon obtained as described in section a of the present example and 2.2 g of pure THA for the polymerisation, the polymerisation being stopped after an olefine injection period equal to 4 hours.

1,110 g of ethylene/but-1-ene/hex-1-ene terpolymer having the following characteristics were collected:

| Content of Ti (ppm, by weight) | 3.5 |
|---|---|
| Content of Al (ppm, by weight) | 196 |
| Mean particle diameter (microns) | 750 |
| Density | 0.921 |
| Bulk density of the heaped product (g/cm$^3$) | 0.417 |
| Melt index (MI$_{190° C.}^{2.16}$) | 1.25 |

EXAMPLE 13 a—Preparation of the Active Solid Hydrocarbon 100 kg of polyethylene powder were sieved by passage through a sieve of 800 micron mesh width and were charged into a stirred reactor and carefully dried by flushing several times with nitrogen at 85° C.

2.2 kg of pure THA were injected onto the stirred polyethylene powder, the reactor being kept at 70° C. under a nitrogen pressure equal to 5 bar, this injection being carried out in the course of 4 hours, and 2 kg of the component based on TiCl$_4$ defined in Example 1 were subsequently introduced into the said reactor via a metering lock.

The pressure inside the reactor was then brought to 12 bar by injection of nitrogen, and subsequently to 13 bar by injection of hydrogen.

25 kg/hour of ethylene and 3 kg/hour of but-1-ene were then passed into the reactor, this injection of olefines being continued for 8 hours, whilst the temperature in the said reactor was kept at 70° C. by means of the cooling system, using water at 27° C., with which the reactor was equipped. During this operation, the pressure in the reactor rose very slightly, to reach 15 bar at the end of the experiment.

After an olefine injection period equal to 8 hours, this injection was interrupted and, after a waiting period of 30 minutes, the gas phase contained in the reactor was purged by decompression and flushing with nitrogen.

4 kg of pure THA were then added to the contents of the reactor with stirring, this injection being carried out in the course of 6 hours, and the contents of the reactor were then emptied through a vibrating sieve of 800 micron mesh width kept under a nitrogen atmosphere.

250 kg of an active solid hydrocarbon were collected in a container kept under nitrogen, and about 50 kg of particles were retained on the sieve and were discarded.

The active solid hydrocarbon had the following characteristics:

| Content of Ti (ppm, by weight) | 120 |
|---|---|
| Content of Al (ppm, by weight) | 1,963 |
| Mean particle diameter (microns) | 350 |

This active solid hydrocarbon was obtained with a mean hourly conversion of ethylene and of but-1-ene equal to 694 g per gramme of titanium and per hour.

b—Gas Phase Polymerisation of a Mixture of Ethylene and But-1-ene in a Fluidised Bed in Contact with the Active Solid Hydrocarbon to give LLDPE 220 kg of a polyethylene powder having a mean particle diameter equal to 950 microns which had first been dried by flushing several times with nitrogen were introduced into a fluidised bed reactor by an external recirculation, and a gaseous reaction mixture containing, in molar proportions, 10% of hydrogen, 20% of nitrogen, 60% of ethylene and 10% of but-1-ene was then established under a relative pressure equal to 20 bar at a temperature of 85° C.

660 g/hour of the active solid hydrocarbon obtained as indicated in section a of this example were then introduced into the reactor, which was stirred by fluidisation, at a rate of injection of 66 g every 6 minutes.

At the second injection, it was noted that the reactor had a tendency to warm up, indicating the start of the polymerisation. The reactor was then kept at 85°C. by cooling the fluidisation gas. The reactor was kept under a relative pressure of 20 bar by changing the entry flow rate of the ethylene, the flow rate of the but-1-ene being fixed at 8% by weight of the flow rate of the ethylene, whilst the flow rates of the nitrogen and hydrogen were adjusted to keep the concentrations of nitrogen and hydrogen in the reaction mixture constant, these concentrations being demonstrated by analysis by gas phase chromatography over two columns.

The amount of powder in the reactor, measured by a differential pressure gauge, was kept constant by varying the frequency at which an extraction lock was opened.

After 5 hours, the reactor thus reached a quasi-permanent state, which was maintained for 120 hours. Over this period, on average 79 kg/hour of ethylene/but-1-ene copolymer powder (LLDPE) having a mean particle diameter of 1.200 microns, a density, measured after annealing for 24 hours, equal to 0.921 and a melt index (MI$_{190° C.}^{2.16}$), measured on the powder, equal to 1.45, were extracted.

The Ti and Al analyses carried out on 5 samples taken regularly in the course of the 120 hours of the stage gave the following results:

| No. of the sample | 1 | 2 | 3 | 4 | 5 |
|---|---|---|---|---|---|
| Ti (ppm, by weight) | 0.7 | 1 | 0.8 | 0.9 | 0.9 |
| Al (ppm, by weight) | 12 | 14 | 16 | 14 | 16 |

In the examples given above to illustrate the invention, the pressures in bar are expressed in bar absolute, unless indicated otherwise, and the flow rates in liters/hour are given under standard conditions of temperature and pressure.

Furthermore, the melt indices were determined in accordance with the standard ASTM D 1238.

We claim:

1. Process for the preparation of an active solid hydrocarbon which can be used to polymerize olefins characterized in that it comprises forming a homogeneous pulverulent composition by combining (a) a component comprising a transition metal compound wherein said metal is chosen from Ti, V, Zr and Cr, in the form of particles having an average diameter of between 0.1 and 500 microns, (b) an inert porous organic or inorganic solid support in the form of a powder wherein said powder has a mean particle diameter of from 1 to 5,000 microns, and (c) a liquid phase containing at least one compound chosen from the organometallic compounds of the metals of groups I to III of the Periodic Table of the Elements, the amounts of the component comprising the transition metal compound and of the organometallic compound or compounds being such that the ratio of the number of atoms of the metal or metals of groups I to III of the Periodic Table to the number of atoms of transition metal is between 0.1 and 800, while the amount of support powder is adjusted so that the mixture produced remains in pulverulent form, and polymerizing, in contact with the above pulverulent composition, one or more $C_2$ to $C_{12}$ olefins so that an active solid hydrocarbon containing an amount by weight of transition metal of between 10 and 50,000 ppm is produced, this polymerization being carried out in the gas phase at a temperature below the melting point of the active solid hydrocarbon, whilst an hourly conversion of the $C_2$ to $C_{12}$ olefin or olefins of less than 500,000 g per gram of transition metal is maintained.

2. Process according to claim 1, characterised in that the pulverulent composition is formed by first mixing the support powder with the liquid phase containing the organometallic compound or compounds and then incorporating the component comprising the transition metal compound into the resulting mixture.

3. Process according to claim 1 or 2, characterised in that the mean particle diameter of the component comprising the transition metal compound is between 1 and 250 microns.

4. A process according to claim 1 characterized in that the component comprising the transition metal compound is formed by combining at least one compound of the transition metals Ti, V, Zr and Cr with at least one magnesium compound, selected from the group consisting of $MgCl_2$, $MgO$, $MgCO_3$, $MgClOH$, magnesium phosphate, $RMgCl$, $Mg(OR)_2$ or $ClMgOR$, in which R is a $C_1$ to $C_8$ alkyl radical alone or combined with a member selected from the group consisting of $AlCl_3$ or the product obtained by contacting $AlCl_3$ with an electron donor.

5. A process according to claim 4, characterized in that the component comprising the transition metal compound also includes at least one adjuvant selected from the group consisting of porous oxide compositions selected from the group consisting of $SiO_2$, $Al_2O_3$, $TiO_2$, $ZrO_2$, zeolites, mixed oxides containing $SiO_2$ and at least one metal oxide selected from the group consisting of $ZrO_2$, $TiO_2$, $MgO$ and $Al_2O_3$ and silicon containing organic compositions.

6. Process according to claim 1, characterised in that the compound or compounds of the transition metals Ti, V, Zr and Cr are chosen from $TiCl_4$, $TiCl_3$, $VCl_4$, $VOCl_3$, $CrCl_3$, vanadium acetylacetonate, chromium acetylacetonate, $Ti(OR)_pCl_{(4-p)}$ and $Zr(OR)_pCl_{(4-p)}$, where R designates a $C_1$ to $C_8$ alkyl radical and p is an integer from 1 to 4.

7. A process according to claim 1, characterized in that the porous solid support comprises at least one member selected from the group consisting of polymers and inorganic compositions selected from the group consisting of silica, talc or magnesia.

8. A process according to claim 7 characterized in that the porous solid support is an olefinic polymer consisting essentially of a polymer or copolymer compatible with the polymer being produced.

9. A process according to claim 1 characterized in that the organometallic compound of the metals of groups I to III of the Periodic Table of the Elements is at least one member selected from the group consisting of isoprenyl-aluminum, alumoxanes, and alkylaluminum of the formula $Al(R')_qX_rH_s$, in which X represents Cl or a monovalent radical $OR'$, $R'$ is a $C_1$ to $C_{16}$ alkyl radical and q, r and s are numbers that $1 \leq q \leq 3$, $0 \leq r \leq 2$ and $0 \leq s \leq 2$, where $q+r+s=3$.

10. Process according to claim 1, characterised in that the organometallic compound or compounds of the metals of groups I to III of the Periodic Table of the Elements are chosen from the hydrocarbon-magnesium compounds, the hydrocarbon-zinc compounds, the hydrocarbon-aluminum compounds and the mixtures of such compounds.

11. A process according to claim 10, characterised in that the said organometallic compounds are selected from the group consisting of an alkyl magnesium of the formula, $YMgR'$, an alkylzinc of the formula $YZNR'$, wherein, Y represents Cl or $R'$ and wherein $R'$ is a $C_1$ to $C_{16}$ alkyl radical and a mixture of an alkyl magnesium of the formula $YMgR'$ with an alkylaluminum of the formula $Al(R')qXrHs$ wherein $1 \leq q \leq 3$, $0 \leq r \leq 2$ and $0 \leq s \leq 2$ and wherein $q+r+s=3$.

12. Process according to claim 10, characterised in that the ratio of the number of atoms of the metal or metals of groups I to III of the Periodic Table of the Elements to the number of transition metal atoms in the transition metal component in the pulverulent composition is between 0.5:1 and 200:1.

13. Process according to claim 12, characterised in that the polymerisation of one or more $C_2$ to $C_{12}$ olefines in contact with the pulverulent composition, which leads to the active solid hydrocarbon, is carried out in a manner such that the said active solid hydrocarbon contains an amount by weight of transition metal originating from the component comprising the transition metal compound of between 50 and 15,000 ppm.

14. Process according to claim 12, characterised in that the gas phase polymerisation of the $C_2$ to $C_{12}$ olefine or olefines in contact with the pulverulent composition is carried out at a temperature between $-20°$ C. and (m.p. $-5°$ C.), where m.p. designates the melting point of the active solid hydrocarbon.

15. Process according to claim 12, characterised in that the hourly conversion of the $C_2$ to $C_{12}$ olefine or olefines in contact with the pulverulent composition is kept between 10 and 100,000 g per gramme of transition metal originating from the transition metal component.

16. A process according to claim 12 characterised in that a single $C_2$ to $C_{12}$ olefine is polymerised in contact with the pulverulent composition.

17. A process according to claim 12, characterized in that a mixture of $C_2$ to $C_{12}$ olefines is polymerized in contact with the pulverulent composition.

18. Process according to claim 16, characterised in that a mixture of ethylene and but-1-ene is polymerised in contact with the pulverulent composition, the said mixture containing a molar proportion of but-1-ene of from 0.1 to 30%.

19. Process according to claim 16, characterised in that a mixture of ethylene, but-1-ene and hex-1-ene is polymerised in contact with the pulverulent composition, the said mixture containing a total molar proportion of but-1-ene and hex-1-ene of from 0.1 to 30%, with a molar ratio of hex-1-ene:but-1-ene such that the hex-1-ene remains in the vapour state under the conditions of the gas phase polymerisation.

20. A process according to claim 1, characterized in that the porous solid support used to prepare the pulverulent composition is selected from the group consisting of polyethylene, polypropylene, a copolymer of ethylene with less than 20 mol % at least one $C_3$ to $C_{12}$ alpha-olefine.

21. A process according to claim 1, characterized in that the polymerization is carried out in the presence of a chain transfer agent.

22. A process according to claim 1, characterized in that the polymerization is carried out discontinuously in a stirred reaction zone at a temperature below the melting point of the active solid hydrocarbon, introducing a controlled amount of the $C_2$ to $C_{12}$ olefine into the zone to obtain an active solid hydrocarbon, and wherein the introduction is carried out in a manner such that the olefine is maintained in the gas phase.

23. Process according to claim 1, characterised in that the polymerisation of the $C_2$ to $C_{12}$ olefine or olefines in contact with the pulverulent composition is carried out continuously in a stirred or fluidised reaction zone into which a flow rate of the pulverulent composition and an hourly flow rate of the $C_2$ to $C_{12}$ olefine or olefines are introduced, the active solid hydrocarbon is extracted from the reaction zone in a manner such that the total amount of solid inside the said zone is kept constant, and the temperature and total pressure in this zone are maintained at the values respectively chosen by cooling the said zone and flushing with gas or adding inert gas.

24. A process according to claim 1, characterized in that a Lewis base electron donor is incorporated into the active solid hydrocarbon in an amount to provide a ratio of the number of metal atoms of groups I to III of the Periodic Table in the active solid hydrocarbon to the number of molecules of electron donor of between 0.1:1 and 50:1.

25. A process according to claim 9 wherein the organometallic compound is in a liquid state.

26. A process according to claim 11 wherein R' is an alkyl of from 1 to 12 carbon atoms.

27. A process according to claim 16 wherein the olefine being polymerised is selected from the group consisting of ethylene, propylene, butene-1, hexene-1, 4-methylpentene-1 and octene-1.

28. A process according to claim 17 wherein the mixture of olefines being polymerised is selected from the group consisting of ethylene and at least one $C_3$ to $C_{12}$ alpha-olefine and propylene and at least one $C_4$ to $C_{12}$ alpha-olefine.

29. A process according to claim 21 wherein the chain transfer agent is hydrogen or an alkyl zinc.

* * * * *